US010344584B2

(12) United States Patent
Anisur Rahman et al.

(10) Patent No.: US 10,344,584 B2
(45) Date of Patent: Jul. 9, 2019

(54) SYSTEMS AND METHODS FOR TRANSIENT-PRESSURE TESTING OF WATER INJECTION WELLS TO DETERMINE RESERVOIR DAMAGES

(71) Applicant: Saudi Arabian Oil Company, Dhahran (SA)

(72) Inventors: Noor M. Anisur Rahman, Dhahran (SA); Saud A. Bin Akresh, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 679 days.

(21) Appl. No.: 15/042,804

(22) Filed: Feb. 12, 2016

(65) Prior Publication Data

US 2017/0234121 A1 Aug. 17, 2017

(51) Int. Cl.
*E21B 47/06* (2012.01)
*E21B 43/20* (2006.01)
(Continued)

(52) U.S. Cl.
CPC .............. *E21B 47/06* (2013.01); *E21B 43/20* (2013.01); *E21B 43/25* (2013.01); *E21B 49/008* (2013.01);
(Continued)

(58) Field of Classification Search
CPC .......... E21B 43/20; E21B 43/25; E21B 47/06; E21B 49/00; E21B 49/008; G01V 11/002; G01V 99/005
See application file for complete search history.

(56) References Cited

U.S. PATENT DOCUMENTS 5,431,227 A * 7/1995 Montgomery ........... C09K 8/72
166/113
5,934,371 A 8/1999 Bussear et al.
(Continued)

FOREIGN PATENT DOCUMENTS

EP 0286152 A1 10/1988
WO 9517581 A1 6/1995
(Continued)

OTHER PUBLICATIONS

SPE-174278; "Modeling Pressure-Transient Data for Characterizing the Formation Dame in Water Injection Wells Operating above the Fracturing Pressure", Saud A. BinAkresh; Jun. 2015 (Year: 2015).*

(Continued)

*Primary Examiner* — Waseem Moorad
*Assistant Examiner* — Christopher J Sebesta
(74) *Attorney, Agent, or Firm* — Bracewell LLP; Constance G. Rhebergen; Christopher L. Drymalla

(57) ABSTRACT

Provided in some embodiments are systems and methods for transient-pressure test of an oil reservoir water injection well system. Embodiments provide for determining a fracturing injection rate for the well, setting a test injection rate preferably below the fracturing injection rate, conducting a stabilized injection of water into a wellbore of the well at the test injection rate for a prescribed period, and conducting a fall-off test including shutting-in the well for a prescribed fall-off period, and acquiring test data indicative of fluid pressure in the wellbore of the well during the injection and the fall-off periods. Embodiments also provide for generating a model prediction, comparing the model to the test data to determine whether it is a match for the well, and associating the parameter values with the well, including the (Continued)

severity and the location of the shallow damage, if the reservoir model is a match.

17 Claims, 8 Drawing Sheets

(51) Int. Cl.
  *E21B 43/25* (2006.01)
  *G01V 11/00* (2006.01)
  *G01V 99/00* (2009.01)
  *E21B 49/00* (2006.01)

(52) U.S. Cl.
  CPC .......... *G01V 11/002* (2013.01); *G01V 99/005* (2013.01); *E21B 49/00* (2013.01)

(56) References Cited

U.S. PATENT DOCUMENTS

| | | | |
|---|---|---|---|
| 7,580,796 | B2 | 8/2009 | Soliman et al. |
| 8,116,980 | B2 | 2/2012 | Beretta et al. |
| 8,437,962 | B2 | 5/2013 | Craig |
| 8,849,637 | B2 | 9/2014 | Chavez et al. |
| 9,085,966 | B2 | 7/2015 | Rahman et al. |
| 2005/0222852 | A1* | 10/2005 | Craig .................... E21B 49/008 166/305.1 |
| 2009/0114010 | A1* | 5/2009 | Beretta ................ E21B 49/008 73/152.51 |
| 2009/0276156 | A1 | 11/2009 | Kragas et al. |
| 2010/0023269 | A1 | 1/2010 | Yusti et al. |
| 2010/0286918 | A1 | 11/2010 | Moos et al. |
| 2010/0307743 | A1 | 12/2010 | Ziuddin |
| 2011/0087471 | A1 | 4/2011 | Postl et al. |
| 2011/0266056 | A1* | 11/2011 | Pop ........................ E21B 49/08 175/50 |
| 2014/0136158 | A1 | 5/2014 | Hegazy et al. |
| 2014/0190695 | A1* | 7/2014 | Van Zanten ............. C09K 8/88 166/281 |
| 2015/0039234 | A1 | 2/2015 | Abou-Sayed et al. |
| 2015/0039275 | A1* | 2/2015 | Mikhailov .......... G06F 17/5009 703/2 |
| 2015/0075787 | A1 | 3/2015 | Davidson et al. |
| 2015/0253453 | A1 | 9/2015 | Aldridge et al. |
| 2016/0003026 | A1 | 1/2016 | Adams et al. |

FOREIGN PATENT DOCUMENTS

| | | |
|---|---|---|
| WO | 2007134747 | 11/2007 |
| WO | 2011025471 A1 | 3/2011 |

OTHER PUBLICATIONS

2 Inflow Performance, Produced Water Reinjection Joint Industry Program; Jan. 1, 2003; http://www.advntk.com/pwrijip2003/pwri/toolbox/monitoring/well_performance/well_performance.htm; pp. 1-38.
Birchenko, V. M., et al., Analytical Modelling of Wells with Inflow Control Devices; Institute of Petroleum Engineering, Heriot-Watt University, Jul. 2010; pp. 1-134.
International Search Report and the Written Opinion for related PCT application PCT/US2013/027949 (SA5026/PCT) dated Feb. 17, 2014; 11 pages.
International Search Report and Written Opinion for related PCT application PCT/US2017/017143 (SA5472/PCT), dated Apr. 5, 2017; 19 pages.
Everdingen et al., "The Skin Effect And Its Influence On The Productive Capacity of A Well", Petroleum Transactions, 1953, vol. 198, AIME, pp. 171-176.
Furui, "A Comprehensive Skin Factor Model for Well Completions Based on Finite Element Simulations", Presented to the Faculty of the Graduate School of University of Texas at Austin, 2004, pp. 1-182.
Li, Z., et al., "Understanding the Roles of Inflow-Control Devices in Optimizing Horizontal-Well Performance" SPE 124677, SPE Annual Technical Conference, Oct. 4-7, 2009; pp. 376-385.
Morris, C. W., et al., Analysis of Geothermal Wells in Naturally Fractured Formations With Rate-Senstive Flow; SPE Formation Evaluation; Dec. 1, 1987; pp. 567-572.
Schlumberger, Well Test Interpretation; Jan. 1, 2002; http://www.fanarco.net/books/reservoir / Well_Test_Interpretation_Schlumberger.pdf; pp. 1-122.
Su, H-J., et al., Modeling of Equalizer Production System and Smart-Well Applications in Full-Field Studies; SPE Reservoir Evaluation & Engineering; Apr. 1, 2009; pp. 318-328; Society of Petroleum Engineers.
Atkinson, C., et al.; "Flow Performance of Horizontal Wells with Inflow Control Devices" Euro. Jnl of Applied Mathmatics (2004), vol. 15, pp. 409-450.
Ouyang, Liang-Biao; "Practical Consideration of an Inflow Control Device Application for Reducing Water Production" SPE 124154, SPE Annual Technical Conference and Exhibition, Oct. 4-7, 2009, pp. 1-19.
van den Hoek, "Pressure Transient Analysis in Fractured Produced Water Injection Wells" SPE 77946; SPE Asia Pacific Oil & Gas Conference and Exhibition; Oct. 8-10 2002; pp. 1-16.
Eaton, Ben A. "Fracture Gradient Prediction and Its Application in Oilfield Operations" Journal of Petroleum Technology; Oct. 1969; pp. 1353-1360.
Fosdick, L.D. "Algorithms" Communications of the ACM; vol. 13 / No. 1 / Jan. 1970; pp. 47-54.
Spivey, J.P. "Variable Wellbore Storage Models for a Dual-Volume Wellbore" SPE 56615; SPE Annual Technical Conference and Exhibition; Oct. 3-6 1999; pp. 1-10.
Binakresh, Saud A., et al. "Modeling Pressure-Transient Data for Characterizing the Formation Damage in Water Injection Wells Operating above the Fracturing Pressure" SPE-174278-MS; SPE European Formation Damage Conference and Exhibition; Jun. 3-5 2015; pp. 1-12.
Binakresh, Saud A., et al. "Challenges in Interpreting Well Testing Data from Fractured Water Injection Wells with a Dual Storage Phenomenon" SPE 139587; SPE Middle East Oil and Gas Show and Conference; Sep. 25-28, 2011; pp. 1-11.
Rahman, N.M., et al. "Profiling Pressure-Derivative Values—A New, Innovative Way to Estimate the Radii of Investigation in Heterogeneous Reservoir Systems" SPE 164217; SPE Middle East Oil and Gas Show and conference; Mar. 10-13, 2013; pp. 1-12.

* cited by examiner

SYSTEMS AND METHODS FOR TRANSIENT-PRESSURE TESTING OF WATER INJECTION WELLS TO DETERMINE RESERVOIR DAMAGES

FIELD OF INVENTION

The present invention relates generally to transient testing of wells and more particularly to systems and methods for transient-pressure testing of water injection wells to determine reservoir damages.

BACKGROUND OF THE INVENTION

Primary production refers to hydrocarbons (e.g., oil and gas) that is recovered naturally from a producing well. Enhanced Oil Recovery (EOR) refers to recovery operations that improve the amount of hydrocarbons recovered from a well. One form of EOR is water injection. Water injection refers to the operation of injecting water into a hydrocarbon reservoir, usually to increase pressure and thereby stimulate production. The water used for water injection is often a brine or other suitable water based fluid that is treated. For example, in some reservoirs water is produced with the hydrocarbons via a production well, removed from the production well and re-injected into the formation. In some instances, water injection is accomplished via an injection well to stimulate hydrocarbon production in a separate production well. For example, a production field may include a production well and a water injection well located some distance from one another. The injection well may include a well drilled specifically for injection operations, or may simply include a production well that has been repurposed for injection operations. Water is injected into the water injection well to increase the pressure in the formation, thereby urging the hydrocarbons to flow through the reservoir formation toward and into the production well. This can aid in extracting hydrocarbons from the reservoir that may otherwise not be recovered.

During a water injection operation for an oil reservoir, water is injected into the reservoir through one or more injection wells in an effort to maintain prescribed reservoir pressures while production wells produce oil from the reservoirs. The injected water enters the permeable sections of the reservoir to fill in the voids created by the evacuation of produced oil, maintaining pressure within the reservoir. As the water moves through the reservoir, it displaces oil and urges the displaced oil towards the producing wells, aiding in effective recovery of the oil from the reservoir. In some instances, the cumulative volume of injected water can be approximately equal to, or slightly higher than, the cumulative oil volume produced from the reservoir. Unfortunately, although the injected water is typically treated in a treatment plant before being injected into the target reservoir, the injected water can sometimes contain fine-suspended solids that can become trapped in the formation of the reservoir. The quality of water received at the wellhead of a water injection well can be adversely affected, for example, by bacterial contamination of shipping lines, biocide batch treatments, line scrapings and the like. Over time the solids trapped in the formation can reduce the permeability of the formation of the reservoir by blocking flow paths of the water through the reservoir. This blockage type of reservoir damage is sometimes referred to as formation plugging. Formation plugging can occur on the face of the formation at the wellbore (e.g., forming a "filter cake" at or near the walls of the wellbore) or deep in the reservoir, within a few inches to few feet of the wellbore. The plugging increases the resistance along the flow path of the water through the formation of the reservoir. The innovative techniques described herein are effective for damage at any depth.

In some instances, an injection well can have a prescribed injection rate determined, for example, based on oil production rates for adjacent production wells. Over time, in an effort to maintain the injection rate for the well, the injection pressure for the well may be increased to overcome the additional resistance attributable to the plugging along the flow path of water. If the injection pressure is too high, however, it can exceed the formation fracture pressure, and induce fractures in the rock formations around the injection well. These formation fractures can, in turn, can provide additional pathways that allow fine-suspended solids in the injected water to travel further into the formation of the reservoir, causing increased damage to deeper sections of the reservoir. Further, such damages are counterproductive to oilfield operations as they can require excessive pumping power, threaten the longevity of flowlines and hardware, and reduce the overall water injection rate and volume. In some instances, well stimulation operations can be employed to remediate the damages. However, it can be more difficult to remediate damages located deeper in the formation of a reservoir, farther from the wellbore.

Transient-pressure tests, also known as well tests, are often performed on wells, including water injection wells, to evaluate performance of individual wells and reservoir characteristics. Well tests can include periodic tests that are conducted on producing oil wells and injecting water wells to acquire certain information about their productivity and injectivity, respectively, and to characterize the in-situ properties of the near-wellbore reservoir regions. Properties derived from such well tests can be important in evaluating the reservoir productivity and injectivity, and accessibility to a reservoir's hydrocarbon reserves, in addition to the ability to understand and characterize reservoir rocks and their dynamic behaviors under in-situ conditions. In typical well test operations, pressure and production or injection rates are measured as functions of time, usually using high-resolution pressure gauges located at surface or downhole. The pressure responses can be analyzed and interpreted by identifying flow regimes using appropriate well and reservoir models. Analyses of the data obtained from well tests, often called pressure-transient analyses, can be used to determine various characteristics, such as reservoir permeability, mobility, formation damage parameter in terms of skin factors, reservoir pressure, reservoir size and shape, and locations of main geological features or boundaries. As recognized by Applicants, such well tests of a reservoir may be negatively affected by damages to the formation of the reservoir.

SUMMARY OF THE INVENTION

Applicants have recognized that damages in the formation of a reservoir can distort the results of transient-pressure tests (also referred to as "well tests"), and that the damages can be difficult to remediate, especially when they are not located at or near the wellbore. With regard to distortion of the results of well tests, Applicants have recognized that the induced fractures can create a phenomenon where the well test data is devoid of a reservoir signature, making it difficult to extract well and reservoir characteristics from the well test data. Well tests typically include a fall-off period, including a shut-in operation in which no water is injected into the well and the pressure and flow in the wellbore is monitored. Where induced fractures are present, the induced fractures can accumulate substantial volumes of water during an active injection operation, but the induced fractures may close as the pressure decreases, forcing the accumulated water out of the fractures. Such a decrease in pressure may occur, for example, during the fall-off period of a well test when no water is injected into the well and the already injected water migrates into the formation. As a result, although there is no water actively being injected into the formation via the well during the fall-off period, the reservoir can see prolonged injection during the fall-off period as the fractures close (due to the decrease in pressure) and the water forced from the fractures moves (e.g., is passively injected) into the formation. While this phenomenon is in progress, the pressure versus time data captured from the well during the fall-off period can be significantly distorted, indicating a relatively large storage volume around the well. That is it may appear that the water remains around the well, although the water is not actually being stored in the area around the well, but is, instead, passively moving into the formation of the reservoir as the induced fractures shrink with the decreasing pressure. This may be referred to as a fracture storage effect. As a result, the pressure may not settle to stabilize rapidly, but may, instead, slowly decrease over an extended period of time (e.g., over a day, several days, weeks, or more) during a fall-off test. If the entire fall-off duration is dominated by this phenomenon, then the well test data may be devoid of a reservoir signature based on the natural flow of fluid through the reservoir, making it difficult to determine characteristics of the well and the reservoir from the well test data.

With regard to remediating damages, Applicants have recognized that traditional remediation techniques, such as well stimulation, can be effective to remediate damages near the wellbore, and may be effective to remediate damages located deep in the formation, away from a sandface of the wellbore of the well (also known as "shallow damages") when the location and the severity of the shallow damage are known beforehand. These damages can be located in the reservoir anywhere from a few inches to a few feet from the wall of the wellbore, or more. Notably, these damages are referred to as "shallow", although these damages can actually be located deep in the reservoir in some cases. That is, because shallow damages are difficult to remediate, it may be particularly important to know the location and the severity of the shallow damage so that an appropriate stimulation operation can be selected and employed to target and remediate the shallow damage.

Accordingly, Applicants have recognized that operating injection wells above the formation fracture pressure for can pose at least two potential problems: (1) it can create a large storage effect that can distort well tests data; and (2) it can cause shallow damage inside the formation of the reservoir that can be difficult to remediate through stimulation operations, especially when the location and the severity of the shallow damage are unknown.

Recognizing these and other shortcomings of existing systems, Applicants have developed novel systems and methods for transient-pressure testing of water injection wells to determine the location and the severity of shallow damages in an oil reservoir. Embodiments, provide for mitigating the effects of a large storage phenomenon due to induced fractures, and determining the location and the severity of shallow damages located deep in the reservoir. Mitigating the effects of the large storage phenomenon may ensure that a substantial part of the well test data contains the signature of reservoir-dominated flow (as opposed to flow that may otherwise be caused by the closure of the induced fractures or similar damage to the reservoir). Determining the location and the severity of damaged zones can provide for selection of appropriate stimulation operations that can be employed to target and remediate the damage, thereby helping to restore the injection performance of the well.

In some embodiments, a transient-pressure test operation (or well test) for a water injection well of an oil reservoir includes the following: (1) determining a test injection rate ($q_{test}$) for the well; (2) conducting an injection operation of the well at the test injection rate ($q_{test}$) for a prescribed period while observing the high-resolution water pressure at the wellhead or a downhole location (when pressure is observed at the wellhead, this must be converted to the downhole conditions to be deemed as "bottomhole pressure data" for further processing and analysis, as described herein); and (3) subsequently running a fall-off test of the well, including obtaining corresponding well test data for the well. The well test data may include injection rate data and corresponding well pressure data, such as a log of the actual injection rate and observed wellbore pressure for the well over the duration of the injection and the fall-off periods. In some embodiments, the test injection rate ($q_{test}$) corresponds to an injection pressure that is preferably below the formation fracture pressure (FFP) of the reservoir. For example, the FFP of the reservoir may be identified, a test pressure ($p_{test}$) below the FFP may be selected, and the test injection rate ($q_{test}$) may be the injection rate that corresponds to the selected test pressure ($p_{test}$). If the injection well is part of a reservoir management strategy that requires a minimum injection rate ($q_{min}$) above an injection rate (q) that corresponds to the formation fracture pressure (FFP) of the reservoir (i.e., the minimum injection rate ($q_{min}$) may result in an injection pressure that is above the FFP), then the minimum injection rate ($q_{min}$) may be selected as the test injection rate ($q_{test}$). Thus, the test injection rate ($q_{test}$) may be kept as low as possible under the given well conditions, including the limits specified by a reservoir management strategy covering the well.

In some embodiments, well test data obtained via a transient-pressure test operation can be used to determine various characteristics of the well and the reservoir, such as the following: a wellbore storage constant (C); a well skin factor (s); a fracture storage constant ($C_f$); a radial location of shallow damage ($r_d$) indicative of the location of shallow damage; a shallow damage skin factor ($s_d$) indicative of a severity of the shallow damage; a first permeability value ($k_1$) indicative of permeability of the formation (e.g., in the radial direction) in a first region that is inside of the location of the radial location of shallow damage ($r_d$); and a second permeability value ($k_2$) indicative of permeability of the formation (e.g., in the radial direction) in a second region that is outside of the location of the radial location of shallow damage ($r_d$). In some embodiments, the determinations can be based on an iterative analysis to determine a "matched" model for the well, including iteratively estimating a set of parameter values for the well (e.g., including values for some or all of the above characteristics) and identifying a model that generates a model prediction (or similar model data) that aligns with, or matches, the observed well test data for the well. Accordingly, the analysis may consider two skin factors; one adjacent to the wellbore (e.g., a well skin factor (s) just in the vicinity of the wall) and one at a shallow depth/radius from the wellbore (e.g., a shallow damage skin factor ($s_d$)). Such a transient-pressure test operation and corresponding analysis of well test data obtained via such a reduced-pressure transient-pressure test operation for a well, may provide a complete characterization of the storage of the well due to induced fractures, as well as an identification of the location and the severity of shallow damage of the well. Such information can be used in the selection of one or more appropriate stimulation operations that can be employed to target and remediate the damage, thereby helping to restore the injection performance of the well.

Provided in some embodiments is an oil reservoir water injection well system, comprising a pump system adapted to inject water into the wellbore a wellbore of a well extending into an oil reservoir, a flow control system adapted to regulate flow of water in the wellbore, a flowmeter system adapted to measure fluid flow in the wellbore, a pressure gauge system adapted to measure fluid pressure in the wellbore, and a surface control unit. The surface control unit adapted to determine whether a minimum injection rate is specified for the water injection well system. In response to determining that a minimum injection rate is specified for the well, set a test injection rate for the well to the minimum injection rate. In response to determining that a minimum injection rate is not specified for the well: determine an injection pressure gradient corresponding to a current injection rate for the well, determine a fracture pressure gradient for the well, determine whether the injection pressure gradient (IPG) is greater than the fracture pressure gradient (FPG). In response to determining that the injection pressure gradient (IPG) is not greater than the fracture pressure gradient (FPG), set the test injection rate for the well to the current injection rate corresponding to the injection pressure gradient (IPG). In response to determining that the injection pressure gradient is greater than the fracture pressure gradient, determine a fracturing injection rate for the well, and set the test injection rate for the well to an injection rate below the fracturing injection rate. Such an adjustment for the test injection rate may minimize the volume of the induced fractures at the later portion of the injection period so that the fracture storage constant, $C_f$, will be relatively small and have a minimal effect in distorting the data during the fall-off period. The surface control unit adapted to conduct an injection test comprising controlling the pump system and the flow control system to regulate a stabilized water injection rate for a prescribed injection period, and acquiring injection test data comprising well injection measurements, from the flowmeter system, that are indicative of fluid flow rate in the wellbore of the well during the prescribed injection period and well pressure measurements, from the pressure gauge system, that are indicative of fluid pressure in the wellbore of the well during the prescribed injection period. The surface control unit also being adapted to conduct a fall-off test comprising: controlling the pump system and the flow control system to shut-in the well for a prescribed fall-off period and acquiring, during the fall-off period, well test data comprising well pressure measurements (from the pressure gauge system) that are indicative of fluid pressure in the wellbore of the well with time during the injection and the fall-off periods, and well injection rate measurements (from the flowmeter system) that are indicative of fluid flow in the wellbore of the well during the period (e.g., that can be used to confirm no fluid flow in the wellbore of the well during the fall-off period).

In certain embodiments the surface control unit is adapted to determine a reservoir model comprising a set of well and reservoir parameter values, the reservoir parameter values comprising a shallow damage skin factor ($s_d$) indicative of the severity of shallow damage in the reservoir, and a radial location of shallow damage ($r_d$) indicative of a radial location the shallow damage in the reservoir from the wellbore. The surface control unit is also adapted to generate a model prediction using the reservoir model, compare the model prediction to the well test data to determine whether the reservoir model is a match for the well, and, in response to determining that the reservoir model is a match for the well, associating the set of well and reservoir parameter values with the well. In some embodiments the surface control unit is adapted to select a shallow damage remediation operation based at least in part on the shallow damage skin factor ($s_d$) and the radial location of shallow damage ($r_d$) associated with the well, and provide for conducting the shallow damage remediation operation to remediate the shallow damage in the reservoir. In some embodiments the well and reservoir model incorporates a wellbore storage constant indicative of fluid storage capacity of the wellbore, a wellbore skin factor indicative of resistance of fluid flow across a wellbore skin of the wellbore, and a fracture storage constant indicative of a fluid capacity of a fracture zone in the reservoir. In certain embodiments, the set of reservoir parameter values include a wellbore storage constant (C) indicative of fluid storage capacity of the wellbore, a well skin factor (s) indicative of resistance of fluid flow across a wellbore skin of the wellbore, a fracture storage constant ($C_f$) indicative of a fluid capacity of a fracture zone in the reservoir, the radial location of shallow damage ($r_d$) indicative of a radial location the shallow damage in the reservoir from the wellbore, the shallow damage skin factor ($s_d$) indicative of the severity of shallow damage in the reservoir, a first permeability value ($k_1$) indicative of permeability of the reservoir in a first region that is inside the radial location of shallow damage ($r_d$), and a second permeability value ($k_2$) indicative of permeability of the reservoir in a second region that is outside of the radial location of shallow damage ($r_d$).

Provided in some embodiments is an oil reservoir water injection well system, comprising a pump system adapted to inject water into a wellbore of a well extending into an oil reservoir, a flow control system adapted to regulate flow of water in the wellbore, a flowmeter system adapted to measure fluid flow in the wellbore, a pressure gauge system adapted to measure fluid pressure in the wellbore, and a control unit. The control unit being adapted to pre-determine a fracturing injection rate for the well (e.g., at which the IPG is equal to the FFG), set a test injection rate for the well to an injection rate below the fracturing injection rate, conduct an injection test comprising controlling the pump system and flow control system to inject water into the wellbore of the well at the stabilized test injection rate for a prescribed period, and acquiring injection test data indicative of fluid flow rate in the wellbore of the well and fluid pressure in the wellbore of the well during the injection period. The control unit being further adapted to conduct a fall-off test that includes controlling the pump system and the flow control system to shut-in the well for a prescribed fall-off period, and acquiring well test data indicative of fluid pressure in the wellbore of the well during the fall-off period.

In some embodiments, the control unit is adapted to determine whether a minimum injection rate is specified for the water injection well system. In response to determining that a minimum injection rate is specified for the well, set the test injection rate for the well to the minimum injection rate. In response to determining that a minimum injection rate is not specified for the well, determine an injection pressure gradient corresponding to a current injection rate for the well, determine a fracture pressure gradient for the well, determine whether the injection pressure gradient is greater than the fracture pressure gradient. In response to determining that the injection pressure gradient is not greater than the fracture pressure gradient, set the test injection rate for the well to the current injection rate corresponding to the injection pressure gradient. In response to determining that the injection pressure gradient is greater than the fracture pressure gradient, determine a fracturing injection rate for the well (e.g., at which the IPG is equal to the FPG), and set the test injection rate for the well to an injection rate below the fracturing injection rate. This adjustment in the water injection rate may keep the induced fracture volume or the water stored therein to a minimum.

In certain embodiments, the well test data includes well pressure measurements, (e.g., acquired via the pressure gauge system) that are indicative of fluid pressure in the wellbore of the well during the fall-off period, and well injection measurements (e.g., acquired via the flowmeter system) that are indicative of fluid flow in the wellbore of the well during the fall-off period.

In some embodiments, the control unit is adapted to determine a reservoir model comprising a set of well and reservoir parameter values. The reservoir parameter values including a shallow damage skin factor ($s_d$) indicative of the severity of shallow damage in the reservoir, and a radial location of shallow damage ($r_d$) indicative of a radial location the shallow damage in the reservoir from the wellbore. The control unit also adapted to generate a model prediction using the reservoir model, compare the model prediction to the well test data to determine whether the reservoir model is a match for the well, and, in response to determining that the reservoir model is a match for the well, associating the set of well and reservoir parameter values with the well. In certain embodiments, the control unit is adapted to select a shallow damage remediation operation based at least in part on the shallow damage skin factor ($s_d$) and the radial location of shallow damage ($r_d$) associated with the well, and provide for conducting the shallow damage remediation operation to remediate the shallow damage in the reservoir. In some embodiments, the reservoir model incorporates a wellbore storage constant indicative of fluid storage capacity of the wellbore, a wellbore skin factor indicative of resistance of fluid flow across a wellbore skin of the wellbore, and a fracture storage constant indicative of a fluid capacity of a fracture zone in the reservoir. In certain embodiments, the set of well and reservoir parameter values include a wellbore storage constant (C) indicative of fluid storage capacity of the wellbore, a well skin factor (s) indicative of resistance of fluid flow across a wellbore skin of the wellbore, a fracture storage constant ($C_f$) indicative of a fluid capacity of a fracture zone in the reservoir, the radial location of shallow damage ($r_d$) indicative of a radial location the shallow damage in the reservoir from the wellbore, the shallow damage skin factor ($s_d$) indicative of the severity of shallow damage in the reservoir, a first permeability value ($k_1$) indicative of permeability of the reservoir in a first region that is inside the radial location of shallow damage ($r_d$), and a second permeability value ($k_2$) indicative of permeability of the reservoir in a second region that is outside of the radial location of shallow damage ($r_d$).

Provided in some embodiments is a method for transient-pressure test of an oil reservoir water injection well system. The method includes determining a fracturing injection rate for the well, setting a test injection rate for the well to an injection rate below the fracturing injection rate, conducting an injection test comprising injecting water into a wellbore of the well at the test injection rate for a prescribed period, and acquiring injection test data indicative of fluid flow rate in the wellbore of the well and fluid pressure in the wellbore of the well during the prescribed injection period. The method also includes conducting a fall-off test including shutting-in the well for a prescribed fall-off period, and acquiring well test data indicative of fluid pressure in the wellbore of the well during the fall-off.

In some embodiments, the method includes determining whether a minimum injection rate is specified for the water injection well system. In response to determining that a minimum injection rate is specified for the well, setting the test injection rate for the well to the minimum injection rate. In response to determining that a minimum injection rate is not specified for the well, determining an injection pressure gradient corresponding to a current injection rate for the well, determining a fracture pressure gradient for the well, determining whether the injection pressure gradient is greater than the fracture pressure gradient. In response to determining that the injection pressure gradient is not greater than the fracture pressure gradient, set the test injection rate for the well to the current injection rate corresponding to the injection pressure gradient. In response to determining that the injection pressure gradient is greater than the fracture pressure gradient determining a fracturing injection rate for the well, and setting the test injection rate for the well to an injection rate below the fracturing injection rate.

In certain embodiments, the well test data includes well pressure measurements that are indicative of fluid pressure in the wellbore of the well during the prescribed fall-off period, and well injection measurements that are indicative of fluid flow in the wellbore of the well during the fall-off period. In some embodiments, the method includes determining a reservoir model comprising a set of well and reservoir parameter values, the reservoir parameter values including a shallow damage skin factor ($s_d$) indicative of the severity of shallow damage in the reservoir, and a radial location of shallow damage ($r_d$) indicative of a radial location the shallow damage in the reservoir from the wellbore. The method further includes generating a model prediction using the reservoir model, comparing the model prediction to the well test data to determine whether the reservoir model is a match for the well, and, in response to determining that the reservoir model is a match for the well, associating the set of reservoir parameter values with the well. In certain embodiments, the method includes selecting a shallow damage remediation operation based at least in part on the shallow damage skin factor ($s_d$) and the radial location of shallow damage ($r_d$) associated with the well, and conducting the shallow damage remediation operation to remediate the shallow damage in the reservoir. In some embodiments, the reservoir model incorporates a wellbore storage constant indicative of fluid storage capacity of the wellbore, a wellbore skin factor indicative of resistance of fluid flow across a wellbore skin of the wellbore, and a fracture storage constant indicative of a fluid capacity of a fracture zone in the reservoir. In certain embodiments, the set of reservoir parameter values include a wellbore storage constant (C) indicative of fluid storage capacity of the wellbore, a well skin factor (s) indicative of resistance of fluid flow across a wellbore skin of the wellbore, a fracture storage constant ($C_f$) indicative of a fluid capacity of a fracture zone in the reservoir, the radial location of shallow damage ($r_d$) indicative of a radial location the shallow damage in the reservoir from the wellbore, the shallow damage skin factor ($s_d$) indicative of the severity of shallow damage in the reservoir, a first permeability value ($k_1$) indicative of permeability of the reservoir in a first region that is inside the radial location of shallow damage ($r_d$), and a second permeability value ($k_2$)

indicative of permeability of the reservoir in a second region that is outside of the radial location of shallow damage ($r_d$).

Provided in some embodiments is a non-transitory computer readable storage medium comprising program instructions for transient-pressure test of an oil reservoir water injection well system. The program instructions executable by a computer processor to cause determining a fracturing injection rate for the well, setting a test injection rate for the well to an injection rate below the fracturing injection rate, conducting an injection test including injecting water into a wellbore of the well at the test injection rate for a prescribed period and acquiring injection test data indicative of fluid flow rate in the wellbore of the well and fluid pressure in the wellbore of the well during the prescribed injection period, and conducting a fall-off test including shutting-in the well for a prescribed fall-off period and acquiring well test data indicative of fluid pressure in the wellbore of the well during the fall-off period.

Figure 1A:
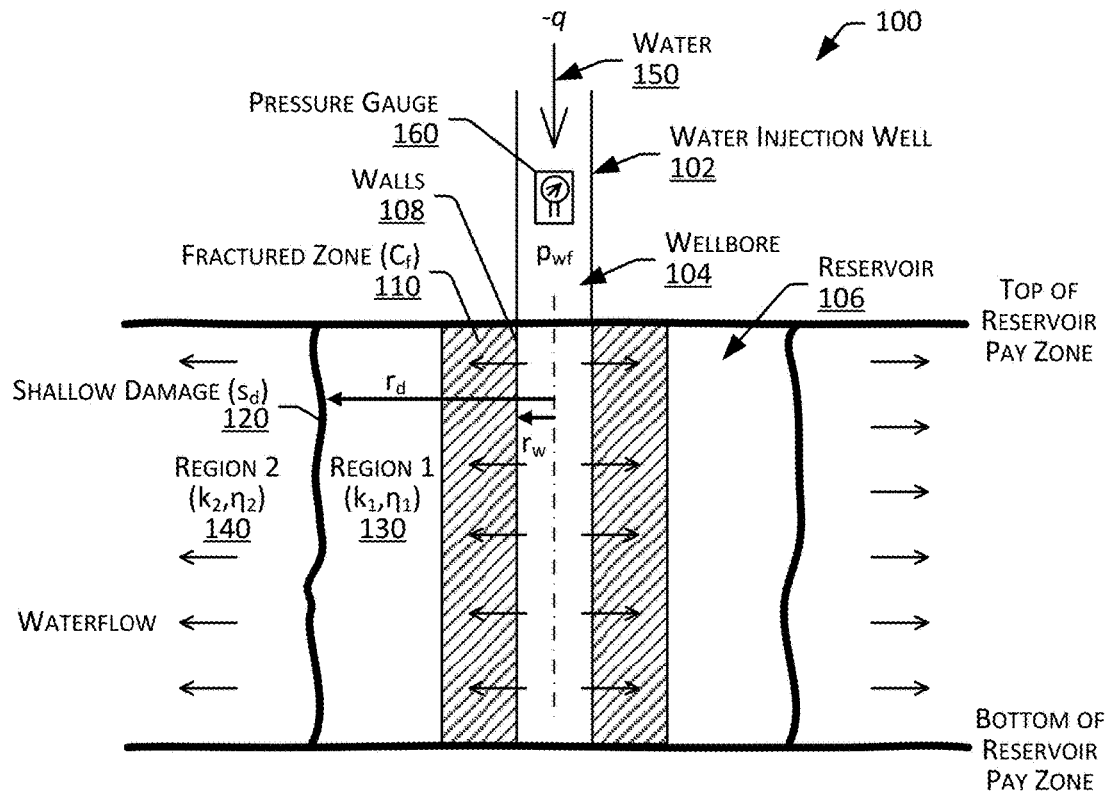
FIGS. 1A and 1B are diagrams that illustrate an example water injection well system in accordance with one or more embodiments.

While this disclosure is susceptible to various modifications and alternative forms, specific embodiments thereof are shown by way of example in the drawings and will be described in detail herein. The drawings may not be to scale. It should be understood, however, that the drawings and the detailed descriptions thereto are not intended to limit the disclosure to the particular form disclosed, but, to the contrary, the intention is to cover all modifications, equivalents, and alternatives falling within the spirit and scope of the present disclosure as defined by the appended claims.

DETAILED DESCRIPTION

The present invention will now be described more fully hereinafter with reference to the accompanying drawings in which example embodiments of the invention are shown. This invention may, however, be embodied in many different forms and should not be construed as limited to the illustrated embodiments set forth herein, rather, these example embodiments are provided so that this disclosure will be thorough and complete, and will fully convey the scope of the invention to those skilled in the art.

Described herein are systems and methods for transient-pressure testing of injection wells to determine damages in a reservoir. For example, embodiments describe a transient-pressure test operation (also known as a well test) for a water injection well of an oil reservoir to acquire corresponding well test data, and analytical solutions for determining various characteristics of the well and the reservoir, including the location and the severity of shallow damages in the reservoir, using the well test data. Accordingly, embodiments provide for mitigating the effects of a large storage phenomenon, and determining the location and the severity of shallow damages located deep in the reservoir. These damages can be located in the reservoir from a few inches to a few feet from the wall or sandface of the wellbore, or more. Notably, these damages are referred to as "shallow", although these damages can actually be located deep in the reservoir in some cases. The innovative embodiments described herein are capable of dealing with the damages at any locations in the reservoir from the sandface in the wellbore to the furthest outer boundary of the reservoir. Mitigating the effects of the large storage phenomenon may ensure that a substantial part of the well test data during a fall-off test contains a signature of reservoir-dominated flow (as opposed to flow that may otherwise be caused by the closure of the induced fractures during a fall-off test). Determining the location and the severity of damaged zones can provide for selection of appropriate stimulation operations that can be employed to target and remediate the damage, thereby helping to restore the injection performance of the well.

In some embodiments, a transient-pressure test operation (or well test) for a water injection well of an oil reservoir includes the following: (1) determining a test injection rate ($q_{test}$) for the well; (2) conducting an injection operation of the well at the stabilized test injection rate ($q_{test}$) for a prescribed period, sometimes referred to as a "stabilization period"; and (3) subsequently running a fall-off test of the well for a prescribed period, including obtaining corresponding well test data for the well. The well test data may include injection rate data and corresponding well pressure data, such as a log of the actual injection rates and observed wellbore pressures for the well over the duration of the prescribed periods of injection and fall-off In some embodiments, the test injection rate ($q_{test}$) corresponds to an injection pressure that is below the formation fracture pressure (FFP) of the reservoir. For example, the FFP of the reservoir may be identified, a test pressure ($p_{test}$) below the FFP at the downhole conditions may be selected, and the test injection rate ($q_{test}$) may be the injection rate that corresponds to the selected test pressure ($p_{test}$) at the downhole conditions. If the injection well is part of a reservoir management strategy that requires a minimum injection rate ($q_{min}$) above an injection rate (q) that corresponds to the formation fracture pressure (FFP) of the reservoir (i.e., the minimum injection rate ($q_{min}$) may result in an injection pressure that is above the FFP), then the minimum injection rate ($q_{min}$) may be selected as the test injection rate ($q_{test}$). Thus, the test injection rate ($q_{test}$) may be kept as low as possible under the given well conditions, including the limits specified by a reservoir management strategy covering the well.

In some embodiments, well test data obtained via a transient-pressure test operation can be used to determine various characteristics of the well and the reservoir, such as the following: a wellbore storage constant (C); a well skin factor (s); a fracture storage constant ($C_f$); a radial location of shallow damage ($r_d$) indicative of the location of shallow damage; a shallow damage skin factor ($s_d$) indicative of the severity of the shallow damage; a first permeability value ($k_1$) indicative of permeability of the formation (e.g., in the radial direction) in a first region that is inside of the location of the radial location of shallow damage ($r_d$); and a second permeability value ($k_2$) indicative of permeability of the formation (e.g., in the radial direction) in a second region that is outside of the location of the radial location of shallow damage ($r_d$). In some embodiments, the determinations can be based on an iterative analysis to determine a "matched" reservoir model for the well, including iteratively estimating a set of parameter values for the well (e.g., including values for some or all of the above characteristics) and identifying a model that generates a model prediction (or similar model data) that aligns with, or matches, the observed well test data for the well. Accordingly, the analysis may consider two skin factors; one adjacent to the wellbore (e.g., a well skin factor (s)) and one at a shallow depth/radius from the wellbore (e.g., a shallow damage skin factor ($s_d$)). Such a transient-pressure test operation and corresponding analysis of well test data obtained via such a reduced-pressure transient-pressure test operation for a well, may provide a complete characterization of the storage of the well due to induced fractures, as well as an identification of the location and the severity of shallow damage of the well. Such information can be used in the selection of one or more appropriate stimulation operations that can be employed to target and remediate the damage, thereby helping to restore the injection performance of the well.

Although certain embodiments are described with regard to an oil production, oil reservoirs, water injection, and water injection wells for the purpose of illustration, it will be appreciated that similar embodiments can be employed for any suitable purpose. For example, similar techniques can be employed for other types of wells and other forms of injection of non-compressible fluids.

Figure 1B:
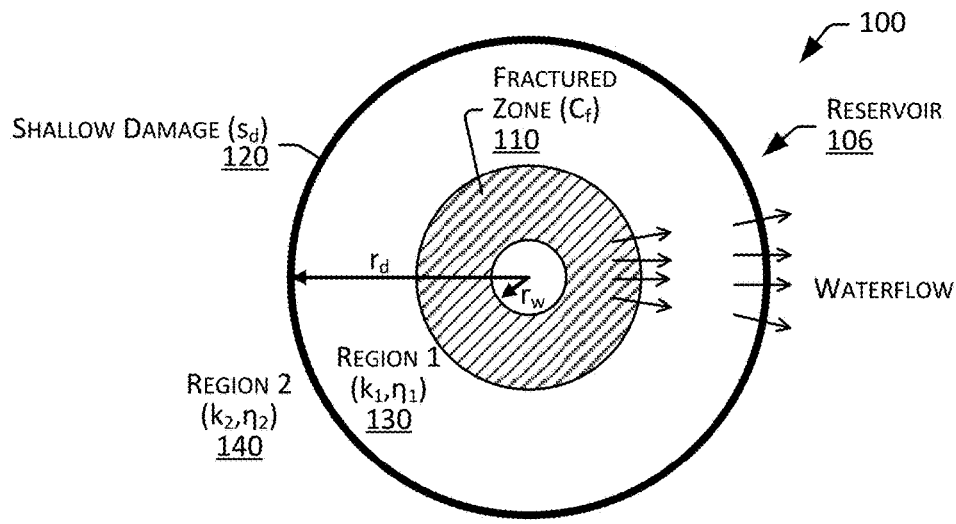

FIGS. 1A and 1B are diagrams that illustrate side and top views, respectively, of an example water injection well system 100 in accordance with one or more embodiments. The water injection well system 100 may include a water injection well 102 that includes a wellbore 104 penetrating an oil reservoir 106 in a subsurface formation (e.g., the wellbore 104 extending between a top and bottom of a pay zone of the reservoir 106 that contains oil, or is otherwise expected to contain oil).

As illustrated, the water injection well system 100 may include a fractured zone 110 immediately surrounding the wellbore 104. The wellbore 104 may have a wellbore radius ($r_w$) defined by the walls (or face) 108 of the wellbore 104 (e.g., the sandface of the formation of the reservoir 106). There can be the well damage zone, causing a well skin factor (s) in the vicinity of 108. The fractured zone 110 may include induced fractures that are caused by water injection or other types of stimulation operations that induce fractures in the rock of the formation surrounding the wellbore 104. For example, the fractured zone 110 may include induced fractures that are created over time as a result of injection operations that are above the formation fracture pressure (FFP) of the formation. The fractured zone 110 may be characterized by a fracture storage constant ($C_f$) that is indicative of the volume of fluid (e.g., the volume injected water) that may be stored in the induced fractures, for example, during a water injection operation or well test. As described herein, the fracture storage constant ($C_f$) for the fractured zone 110 may be determined via a transient-pressure test operation and corresponding analysis of the well test data obtained via the transient-pressure test operation.

The water injection well system 100 may include shallow damage 120 at some radial distance ($r_d$) from the wellbore 104. The shallow damage 120 may include blockage or formation plugging that is caused by solids deposited into the reservoir 106 during water injection or other types of stimulation operations. For example, during a water injection operation, fine-solid particles that remain in the injected water 150, may travel through the flowpaths created in the induced fractures of the fractured zone 110 and through some additional porous portions of the formation of the reservoir 106 before they are trapped in the reservoir, blocking or plugging what could otherwise be a flow path for the injected water 150. The shallow damage 120 may be characterized by a shallow damage skin factor ($s_d$). As described herein the, the radial distance (e.g., a radial location) ($r_d$) and the skin factor ($s_d$) of the shallow damage 120 may be determined via a transient-pressure test operation and corresponding analysis of the well test data obtained via the transient-pressure test operation.

A first region of the reservoir (Region 1) 130 may be located inside of the shallow damage 120, and second region of the reservoir (Region 2) 140 may be located outside of the shallow damage 140. That is, the first region 130 may include the portion of the formation of the reservoir 106 located between the wellbore 104 and the shallow damage 120, and the second region 140 may include the portion of the formation of the reservoir 106 located beyond the shallow damage 120 (e.g., on the opposite side of the shallow damage 120 from the wellbore 104). The first region 130 may include the fractured zone 110. The first region 130 be characterized by a first permeability ($k_1$) indicative of permeability of the formation (e.g., in the radial direction) in the first region 130 and a first hydraulic diffusivity ($\eta_1$). The second region 140 may be characterized by a second permeability ($k_2$) indicative of permeability of the formation (e.g., in the radial direction) in the second region 140 and a second hydraulic diffusivity ($\eta_2$). As described herein the, first permeability ($k_1$) and the second permeability ($k_2$) may be determined via a transient-pressure test operation and corresponding analysis of the well test data obtained via the transient-pressure test operation.

During a water injection operation, water 150 may be injected into the wellbore 104 of the injection well 102 at an injection rate (q). A negative sign may be associated with the injection rate (q) pursuant to standard nomenclature for injection wells. The water 150 may flow down through the wellbore 104, and travel into the formation of the reservoir 106 through the well damage zone with a well skin factor (s) if present, as illustrated by the arrows extending from the wellbore 104 into the fractured zone 110. The injected water 150 may continue to travel through the flowpaths in the first region 130, e.g., including the voids in the induced fractures of the fractured zone 110 and other porous portions of the first region 130, to or through the shallow damage 120. Water 150 that flows past the shallow damage 120 may continue through the second region 140. The resulting water flow may urge oil trapped in the reservoir in the direction of the water flow (e.g., toward and into a wellbore of a nearby production well). Pressure in the wellbore 104 (e.g., wellbore pressure ($p_{wf}$) may be monitored by one or more pressure gauges 160 (e.g., located at the surface or downhole).

Blocking or plugging at the shallow damage 120 may generate additional resistance that can cause a pressure drop across the shallow damage 120. This pressure drop may require the water 150 to be injected at a relatively higher pressure to generate water flow beyond the shallow damage 120 that has a relatively lower pressure. This pressure drop can require additional pumping power, and may require injection at a pressure above the formation fracture pressure (FFP) (in at least the first region 130) to maintain a desired pressure and flow rate in the second region 140. The additional pumping power can be costly due to the need for additional power, increasing the wear and tear on pumping equipment, and potentially requiring the use of larger equipment capable of providing the need injection rate and pressure. Moreover, operating at a pressure above the FFP can cause additional damage to the formation, such as additional induced fractures in the first region 130 and shallow damages 120 as particles in the water 150 are able to flow into and through the induced fractures.

Figure 2:
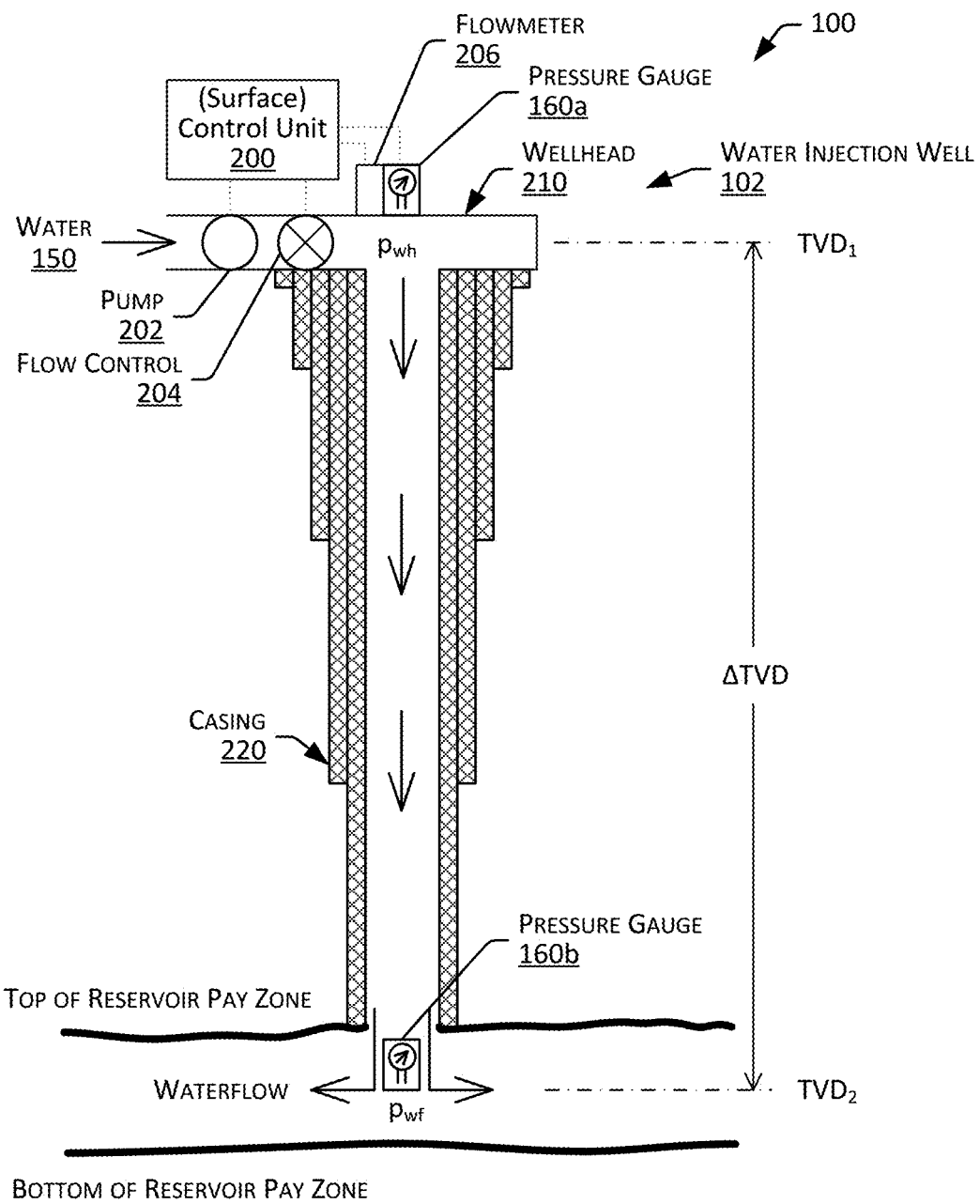
FIG. 2 is a diagram that illustrates an example water injection operation in accordance with one or more embodiments.

FIG. 2 is a diagram that illustrates an example water injection well system 100 in accordance with one or more embodiments. The water injection well system 100 may include a control unit (e.g., a surface control unit) 200, a pump 202, a flow control (e.g., a valve or choke control) 204, a flowmeter 206, and pressure gauges 160 (e.g., a wellhead pressure gauge 160a and a downhole pressure gauge 160b). In some instances, pressure gauges are not simultaneously located at both locations of 160a and 160b. For example, if a pressure gauge is located at wellhead 160a, there may not be any pressure gauge located downhole at 160b simultaneously). In such a case the measured pressure data taken at the wellhead can be converted to the downhole conditions to determine corresponding downhole pressure data. Each of the pump 202, the flow control 204, and pressure gauges 160 may be in communication with the control unit 200 (e.g., via a wired or wireless connection). The wellbore 104 may include wellbore casing 220 or similar wellbore liner. The top of the reservoir payzone may be located at the end of the casing 220, or in a portion of the casing that is perforated to enable fluid flow from the wellbore 104 into the surrounding formation of the reservoir 106. $TVD_1$ and $TVD_2$ may represent the true vertical depths at the wellhead 210 and mid-reservoir level (e.g., about the middle of the payzone of the reservoir 106) from a datum level, respectively, and $\Delta TVD$ may be the true vertical depth from the wellhead 210 to the mid-reservoir level.

The surface pressure gauge 160a may include one or more high-resolution pressure sensors located at or near the surface, and may be used to monitor the fluid pressure in the wellbore 104 at or near the surface. For example, the surface pressure gauge 160a may be located at or near a wellhead 210 of the injection well, and may be used to sense/detect a surface (or wellhead) wellbore pressure ($p_{wh}$) that is indicative of the fluid pressure of the water 150 in the wellbore 104 at or near the wellhead 210. The downhole high-resolution pressure gauge 160b may be located some depth in the wellbore 104, and may be used to monitor the fluid pressure in the wellbore 104 at the depth. For example, the downhole pressure gauge 160b may be located in the wellbore 104 at or near the pay zone of the reservoir 106, and may be used to detect a downhole (or reservoir or formation) wellbore pressure ($p_{wf}$) that is indicative of the fluid pressure of the water 150 in the wellbore 104 at or near the pay zone of the reservoir 106. The downhole pressure gauge 160b may be located on a downhole tool lowered into the wellbore 104 (e.g., via a drill string, wireline, or the like). Although a single surface pressure gauge 160a and a single downhole pressure gauge 160b are described for the purpose of illustration, embodiments can employ any suitable number of pressure gauges 160 disposed in suitable locations.

The pump 202 may include one or more fluid pumps for pumping pressurized fluid into the wellbore 104. For example, pump 202 may include a fluid pump and conduit for pumping treated water 150 into the wellbore 104 via the wellhead 210 at a prescribed pressure and injection rate (q). As described herein, the injection pressure and/or rate (q) may be selected to achieve a desired downhole (or reservoir) wellbore pressure ($p_{wf}$).

The flow control (e.g., a valve or choke control) 204 may include one or more values for controlling the flow of fluid into the wellbore 104. For example, the flow control 204 may include a valve or choke control that can be opened to facilitate and control the flow rate of treated water 150 into the wellbore 104, and can be closed to prevent, or otherwise inhibit, the flow of the treated water 150 into the wellbore 104 and/or to prevent, or otherwise inhibit, back-flow of the injected treated water 150 from the wellbore 104. In some embodiments, the flow control 204 may include one or more pressure and/or flow regulators for regulating the injection pressure and/or rate (–q).

The flowmeter 206 may include one or more flowmeters used to monitor the flow rate of fluid flowing into the wellbore 104. For example, the flowmeter 206 may be located at or near a wellhead 210 of the injection well 102, and may be used to sense/detect a flow rate that is indicative of the rate of the injection of water 150 into the wellbore 104 at or near the wellhead 210.

The control unit 200 may include a control unit for coordinating operation of the various components of the injection well system 100. For example, during a water injection operation, the control unit 200 may identify a desired injection pressure and/or rate (q), and control operation of the pump 202 and the flow control (e.g., a valve or choke control) 204 to inject the water 150 into the wellbore 104 at or near the desired injection pressure and/or rate (q). The control unit 200 may operate in a feedback loop, obtaining feedback from various sensors throughout the system 100 (e.g., including pressure measurements from pressure gauges 106 and flow rate measurements from the flowmeter 206) and automatically controlling/adjusting operations of the pump 202 and/or the flow control (e.g., a valve or choke control) 204 based on the feedback. In some embodiments, during a transient-pressure test operation, such as that described herein, the control unit 200 may identify a desired test pressure ($p_{test}$) and/or test injection rate ($q_{test}$), and control operation of the operation of the various components of the injection well system 100 to inject water 150 into the wellbore 104 at the test pressure ($p_{test}$) and/or injection rate ($q_{test}$) for the duration of a prescribed period (e.g., 200 hours). At the termination of the prescribed injection period, the control unit 200 may command the flow control (e.g., a valve or choke control) 204 to close and the pump 202 to stop pumping, shutting-in the well 102 such that water 150 is no longer actively injected into the wellbore 104. During a prescribed fall-off period (e.g., 100 hours) following the shut-in of the well 102, the control unit 200 may continue to obtain and log wellbore pressure and/or flow measurements with time from the high-resolution pressure gauges 106 and/or the flowmeter 104. The control unit 200 may process this "well test data" to identify various parameters of the well 102 and the reservoir 106, such as the following: a wellbore storage constant (C); a well skin factor (s); a fracture storage constant ($C_f$); a radial location of shallow damage ($r_d$) indicative of the location of shallow damage 120; a shallow damage skin factor ($s_d$) indicative of the severity of the shallow damage 120; a first permeability value ($k_1$) indicative of permeability of the formation (e.g., in the radial direction) in the first region 130; and a second permeability value ($k_2$) indicative of permeability of the formation (e.g., in the radial direction) in the second region 140. In some embodiments, the processing can include an iterative analysis to determine a "matched" model for the well 102, including iteratively estimating a set of parameter values for the well (e.g., including some or all of the above characteristics) and identifying a well model that aligns with or "matches" the observed well test data for the well 102. As described herein, the values of the location of shallow damage ($r_d$) and the shallow damage skin factor ($s_d$) may be used to identify the location and the severity of the shallow damage 120.

Figure 3:
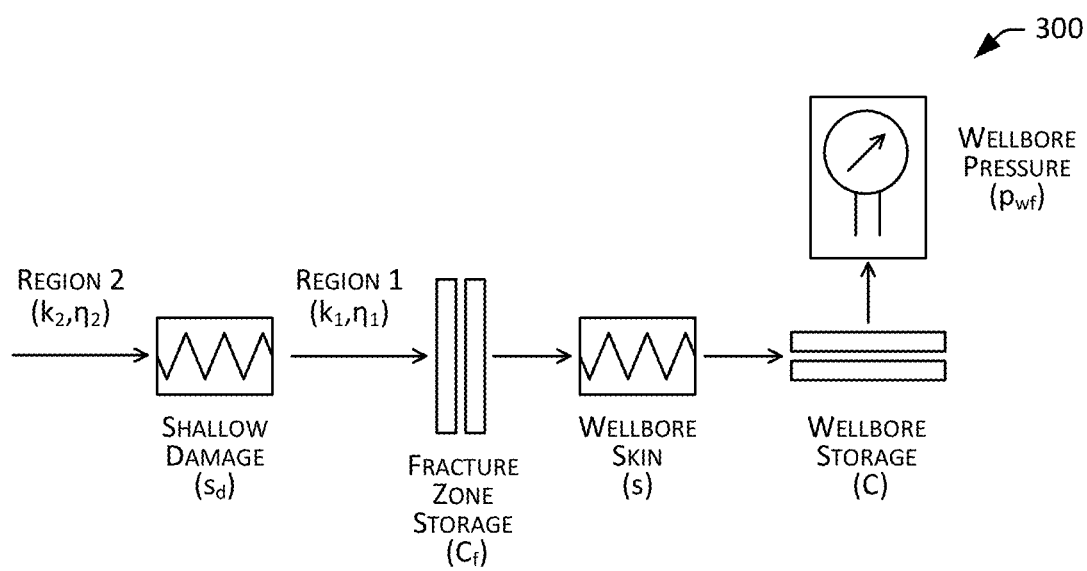
FIG. 3 is a block diagram that illustrates example characterization of elements of a water injection well system contributing to wellbore pressure in accordance with one or more embodiments.
Figure 5:
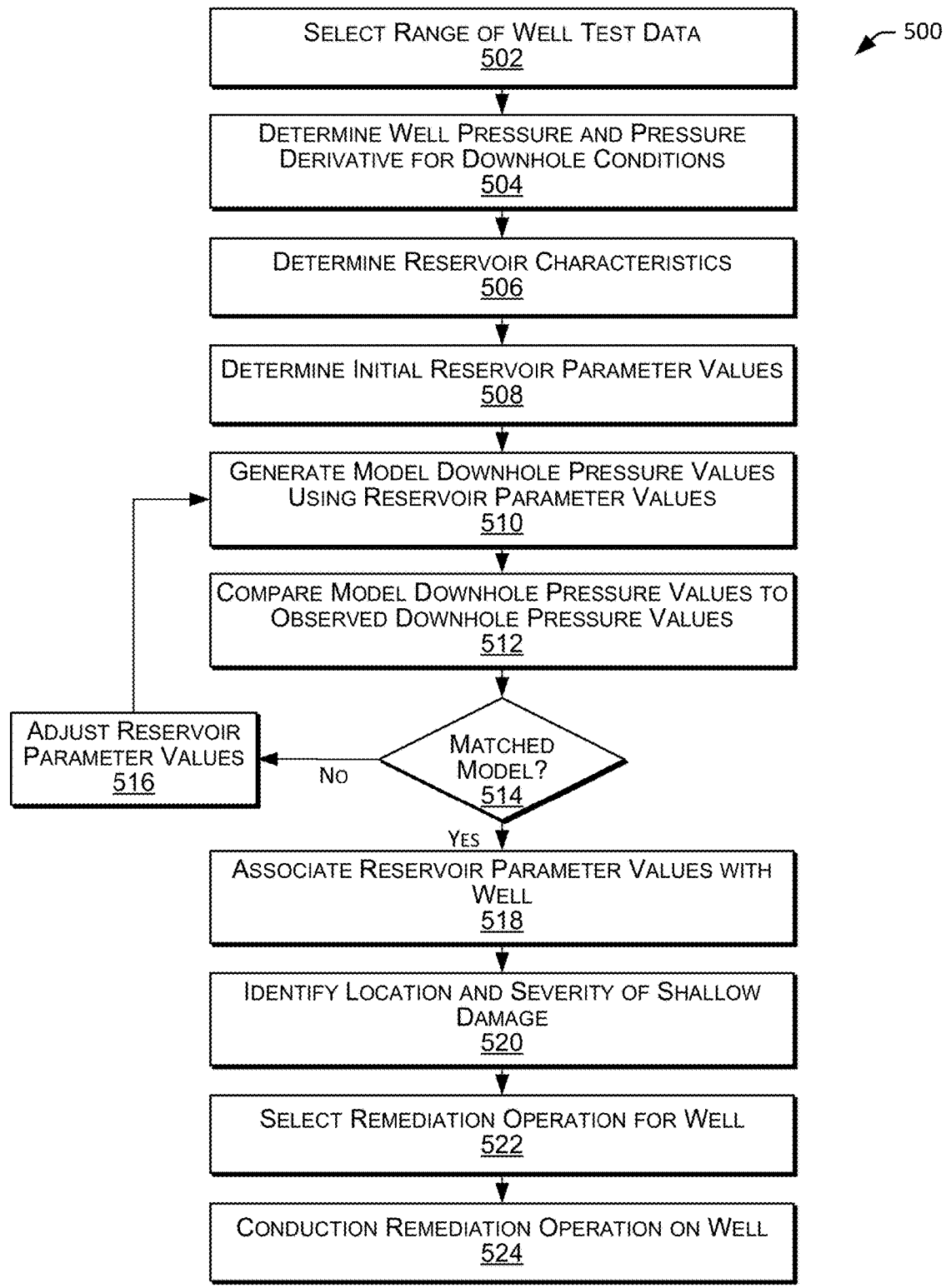
FIG. 5 is a flowchart diagram that illustrates an example method for determining reservoir parameters for a water injection well in accordance with one or more embodiments.

FIG. 3 is a block diagram 300 that illustrates example characterization of contributing elements to a pressure measurement in a water injection well system in accordance with one or more embodiments. This characterization may serve as a basis for analytical approaches for modeling water injection wells described herein. As illustrated, elements contributing to the surface wellbore pressure ($p_{wf}$) may include formation pressure in a second region (140), the resistance to flow across the shallow damage (120) (e.g., characterized by a the shallow damage skin factor ($s_d$)), formation pressure in a second region (140), the fluid storage capacity of the fracture zone (e.g., characterized by a fracture storage constant ($C_f$)), the resistance to flow across the skin (or face) of the wellbore (104) (characterized by a the wellbore skin factor ($s_s$)), and the storage capacity of the wellbore (104) (e.g., characterized by a wellbore storage constant (C)). Accordingly, such a modeling of a well takes into account at least two skin factors; the shallow damage skin factor ($s_d$) and the wellbore skin factor ($s$). This dual consideration may enable a determination of both the location and the severity of the shallow damage as described herein. Block 510 of method 500 in FIG. 5 presented later provides for execution this step in accordance with certain embodiments.

The following describes examples and procedures for conducting transient-pressure and examples methods for interpreting the resulting well test data. Notably, an increase in the fracture storage constant ($C_f$) can delay the appearance of reservoir-dominated flow in actual transient-pressure tests (e.g., in fall-off tests). Shallow damage ($s_d$) can be initiated by the induced fractures, potentially slowing the fluid flow from the wellbore into the reservoir, thereby causing the wellbore pressure to remain relatively high and/or the wellbore fluid flow to remain relatively low for a long enough period that a signature of the reservoir-dominated flow is not present, or at least discernable, from the well test data. Thus, it may be desirable to conduct a test procedure that attempts to minimize the induced fractures around a water injection well which can be the root causes of having the fracture storage constant ($C_f$), potentially revealing a signature of the reservoir-dominated flow early in the well test data, or at least at some point in the well test data. To accomplish this, it may be desirable to employ a test injection pressure that is below the formation fracture pressure (FFP) (e.g., accomplished with a reduced injection rate over a prescribed injection period preceding the fall-off test during which the well test data is acquired). Such a reduction may bring the volume of the induced fractures to a minimum as they shrink with the reduced fluid pressure of the fluid contained therein. Where a reservoir management strategy dictates that the injection rate and/or pressure must be maintained at or above a minimum injection rate and/or pressure, and that minimum injection rate and/or pressure is above a target/reduced injection rate and/or pressure, then the test injection rate and/or pressure may not be reduced to the target/reduced injection rate and/or pressure. In such a case, the test injection rate and/or pressure may be kept as low as possible under the given circumstances, such as at the minimum injection rate and/or pressure for the well according to the reservoir management strategy.

To benchmark a target level of the injection rate and pressure, the fracture pressure or fracture pressure gradient (FPG) of the reservoir where the water is injected into may be considered. A pressure gradient may refer to a change in pressure as a function of distance. As used herein, FPG refers to change in pore pressure with true vertical depth (which can be measured by formation tests, and implies formation fluid density and/or fluid contacts) or to a change in wellbore fluid pressure with depth (which can be measured with production logs, and implies wellbore fluid density). The FPG of a formation may be predicted by utilizing a suitable method, for example, the one as described by B. A. Eaton, "Fracture Gradient Prediction and Its Application in Oilfield Operations," Journal of Petroleum Technology (October 1969) pp. 1353-1360.

Referring to FIG. 2, a wellbore cross-section for the illustration of the relevant hydraulics with reference to knowing the bottomhole injection pressure ($p_{wf}$) at the wellbore, and injection pressure gradient (IPG) for a well can be calculated from the following equation:

$$IPG = \frac{p_{wf}}{\Delta TVD} = \frac{p_{wf}}{TVD_2 - TVD_1} \quad (1)$$

where $p_{wf}$ represents a bottomhole pressure, $TVD_1$ and $TVD_2$ respectively represent the true vertical depths at the wellhead and mid-reservoir level (e.g., about the middle of the payzone of the reservoir) from a datum level, and $\Delta TVD$ represents the true vertical depth from the wellhead to the mid-reservoir level. The bottomhole pressure ($p_{wf}$) during injection may be taken at the mid-reservoir depth ($TVD_2$) (e.g., measured using a pressure gauge located at the mid-reservoir depth ($TVD_2$)). In some instances, bottomhole pressure ($p_{wf}$) is calculated utilizing measured values of wellhead pressure ($p_{wh}$), an estimated frictional pressure drop and a hydrostatic pressure gradient using a continuity of energy equation. This step can be performed, for example, when the high-resolution wellhead pressure ($p_{wh}$) is measured during testing. Hence Equation 1 may use measured or calculated values of bottomhole pressure ($p_{wf}$) to calculate the injection pressure gradient (IPG).

Referring to Equation 1, when the injection pressure gradient (IPG) equals the fracture pressure gradient (FPG) (i.e., IPG=FPG), the injection pressure ($p_{wf\ FPG}$) at the mid-reservoir depth (also referred to as the wellbore flowing pressure) at downhole conditions at which IPG=FPG can be estimated as follows:

$$p_{wf\ FPG} = FPG(TVD_2 - TVD_1) = FPG \Delta TVD \quad (2)$$

Using the determined injection pressure ($p_{wf\ FPG}$) at the mid-reservoir depth at downhole conditions at which IPG=FPG, the limiting injection rate ($q_{FPG}$) for a given well cross-section can be determined by incorporating the frictional pressure drop and the hydrostatic pressure gradient in the continuity of energy equation. An injection rate greater than the limiting injection rate ($q_{FPG}$) may be expected to create induced fractures in the formation of the reservoir. Where, for example, there exists a reservoir management strategy specifying a minimum injection rate ($q_{min}$) for the subject well, the test injection rate ($q_{test}$) may not be lower than the minimum injection rate ($q_{min}$) to satisfy the reservoir management strategy, even though it may be desirable for the test injection rate ($q_{test}$) to be even lower to minimize the volume of induced fracture and the associated fracture storage constant ($C_f$).

Figure 4:
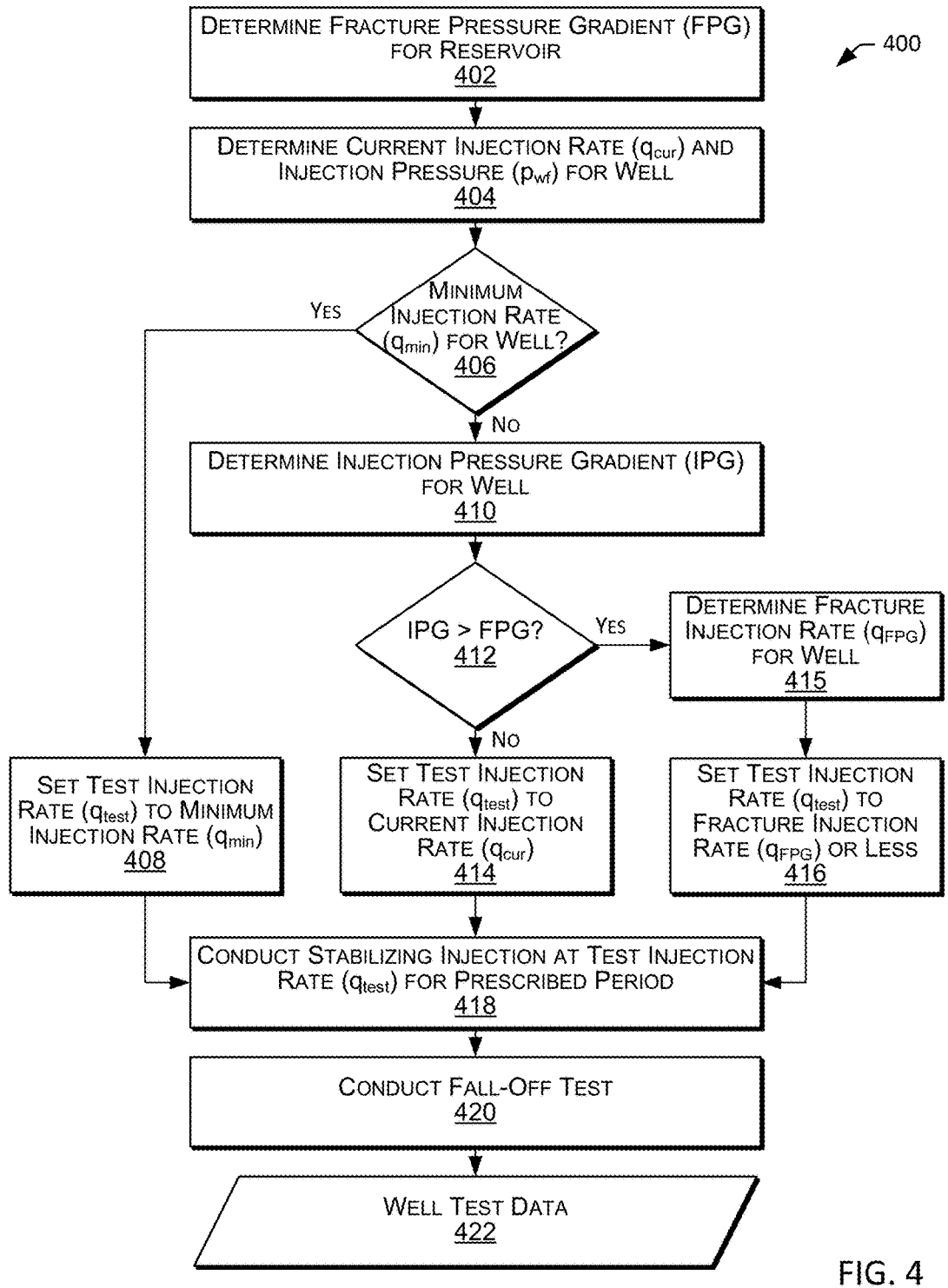
FIG. 4 is a flowchart diagram that illustrates an example method for conducting a transient-pressure test operation for a water injection well in accordance with one or more embodiments.

FIG. 4 is a flowchart diagram that illustrates an example method 400 for conducting a transient-pressure test operation for a water injection well in accordance with one or more embodiments. Method 400 may be performed, for example, by the control unit 200. The method 400 may include determining a fracture pressure gradient (FPG) for a reservoir (block 402). In some embodiments, determining a fracture pressure gradient (FPG) for a reservoir includes retrieving a FPG for the reservoir from a database (e.g., a rock mechanics database). For example, referring to FIGS. 1 and 2, a processor of the control unit 200 may retrieve the FPG for the reservoir 106 from a rock mechanics database stored in a memory of the control unit 200. The FPG may be, for example, about 0.7 psi/ft of a certain rock.

The method 400 may include determining a current injection rate ($q_{cur}$) and a current injection pressure ($p_{wf}$) for the well (block 404). In some embodiments, determining a current injection rate ($q_{cur}$) and a current injection pressure ($p_{wf}$) for the well is based on historical data for the well. For example, referring to FIGS. 1 and 2, a processor of the control unit 200 may determine a current injection rate ($q_{cur}$) and a current injection pressure ($p_{wf}$) for the well 102 using historical injection rate and wellbore pressure data for the well 102 over a preceding duration (e.g., the previous 24 hours) stored in a memory of the control unit 200.

The method 400 may include determining whether the well is associated with a minimum injection rate ($q_{min}$) (block 406). In some embodiments, determining whether the well is associated with a minimum injection rate ($q_{min}$) is based on whether a reservoir management strategy requires a minimum injection rate ($q_{min}$). For example, referring to FIGS. 1 and 2, a processor of the control unit 200 may determine whether a reservoir management strategy (e.g., stored in a memory of the control unit 200) for the reservoir 106 in which the well 102 is located requires a minimum injection rate ($q_{min}$). If it is determined that the well is associated with a minimum injection rate then the method 400 may proceed to setting a test injection rate ($q_{test}$) to the minimum injection rate ($q_{min}$) (block 408). For example, if the control unit 200 determines that the well 102 is associated with a minimum injection rate ($q_{min}$) of about –4,300 STB/day (Standard Barrels (of liquid) per Day) (e.g., corresponding to an injection pressure ($p_{wf}$) of about 4,775 psia (pounds per square-inch absolute)), then the control unit 200 may set the test injection rate ($q_{test}$) for the well 102 to a value of about –4,300 STB/day (e.g., $q_{test}=q_{min}$).

If it is determined that the well is not associated with a minimum injection rate ($q_{min}$), then the method 400 may proceed to determining an injection pressure gradient (IPG) for the well (block 410) and determining whether the injection pressure gradient (IPG) is less than the fracture pressure gradient (FPG) (block 412). For example, if the control unit 200 determines that the well 102 is not associated with a minimum injection rate ($q_{min}$), then the control unit 200 may determine an injection pressure gradient (IPG) for the well 102 and compare the determined injection pressure gradient (IPG) for the well 102 to the fracture pressure gradient (FPG) for the well 102 (e.g., the FPG determined at block 402). In some embodiments, the injection pressure gradient (IPG) can be determined by determining a bottomhole pressure ($p_{wf}$) (e.g., measured or calculated from wellhead pressure ($p_{wh}$)) and the relationship defined by Equation 1 (above). That is, the current injection pressure gradient (IPG) corresponding to the current bottomhole pressure ($p_{wf}$) can be determined.

If it is determined that the injection pressure gradient (IPG) is not greater than (e.g., greater than or equal to) the fracture pressure gradient (FPG), then the method 400 may proceed to setting the test injection rate ($q_{test}$) for the well to the current injection rate ($q_{cur}$) (block 414). That is, if the current injection rate ($q_{cur}$) is not expected to induce fractures, the current injection rate ($q_{cur}$) may be used as the test injection rate ($q_{test}$). For example, if the control unit 200 determines that the well 102 is associated with an injection pressure gradient (IPG) of about 0.62 psi/ft, and a fracture pressure gradient (FPG) of about 0.7 psi/ft, and the well has a current injection rate ($q_{cur}$) of about –12,300 STB/d (that is below the fracture pressure gradient (FPG)), then the control unit 200 may set the test injection rate ($q_{test}$) for the well 102 to a value of about –12,300 STB/d (e.g., $q_{test}=q_{cur}$).

If it is determined that the injection pressure gradient (IPG) is greater than the fracture pressure gradient (FPG), then the method 400 may proceed to determining a fracturing injection rate (also referred to as limiting injection rate) ($q_{FPG}$) for the well (block 415), and setting the test injection rate ($q_{test}$) for the well to the fracturing injection rate ($q_{FPG}$) (block 416). For example, if the control unit 200 determines that the well 102 is associated with an injection pressure gradient (IPG) of about 0.74 psi/ft due to the current injection rate ($q_{cur}$) of –22,600 STB/d, and a fracture pressure gradient (FPG) of about 0.7 psi/ft, then the control unit 200 may determine a fracturing injection rate ($q_{FPG}$) for the well 102 of about –16,100 STB/d, and set the test injection rate ($q_{test}$) for the well 102 to a value of about –15,000 STB/d or below (e.g., $q_{test} \leq q_{FPG}$). In some embodiments, a fracturing injection rate ($q_{FPG}$) for a well can be determined as the injection rate (q) that corresponds to the determined injection pressure ($p_{wf\,FPG}$) at the mid-reservoir depth at downhole conditions at which IPG=FPG (e.g., by incorporating the frictional pressure drop and the hydrostatic pressure gradient in the continuity of energy equation).

Method 400 may include conducting a stabilized injection into the well at the test injection rate ($q_{test}$) for a prescribed injection period (block 418). In some embodiments, conducting a stabilized injection into the well at the test injection rate ($q_{test}$) for a prescribed injection period includes injection of treated water into the wellbore of the well at the test injection rate ($q_{test}$) for a duration that ensures stabilization of pressure. For example, referring to FIG. 2, where the transient-pressure test operation includes a prescribed period of water injection and a prescribed period of shut-in for a fall-off test of about 100 hours in duration, the control unit 200 may control operation of the pump 202 and flow control (e.g., valve or choke control) 204 to provide for the flow of water 150 into the wellbore 104 at the test injection rate ($q_{test}$) (e.g., about –4,300 STB/day) for 1,000 hours leading up to the subsequent shut-in for the fall-off test of the well 102, thereby allowing the well 102 (and any induced fractures) to stabilize at the test rate ($q_{test}$) prior to the shut-in for the fall-off test of the well 102.

Method 400 may include conducting a fall-off test of the well (block 420). In some embodiments, conducting a fall-off test of the well includes shutting-in the well such that no additional water is actively being injected (e.g., via pumping or a similar forced flow) into the wellbore, and monitoring the pressure and flow of water in the wellbore. For example, referring to FIG. 2, at the end of prescribed injection period (e.g., at about 1,000$^{th}$ hour), the control unit 200 may command the flow control (e.g., valve or choke control) 204 into a closed position (e.g., to inhibit reverse flow of the already injected water 150 from the wellbore 104) and command the pump 202 to stop pumping water 150. The shut-in period may last, for example, for about 100 hours. During the shut-in period, the control unit 200 may collect well test data 422. The well test data 422 may include pressure and flow rate measurements acquired by the control system 200 from the pressure gauges 106 and flowmeters 206 of the well 102 during the injection period (e.g., injection test well data acquired during an injection test of the well 102) and/or the shut-in period (e.g., fall-off test well data during a fall-off test of the well 102). The control unit 200 may store the collected well test data 422 in a memory. As discussed herein, the well test data 422 obtained via such a transient-pressure test operation can be used to determine various characteristics of the well 102 and the reservoir 106, such as the following: a wellbore storage constant (C); a well skin factor (s); a fracture storage constant ($C_f$); a radial location of shallow damage ($r_d$) indicative of the location of shallow damage; a shallow damage skin factor ($s_d$) indicative of the severity of the shallow damage; a first permeability value ($k_1$) indicative of permeability of the formation (e.g., in the radial direction) in a first region that is inside of the location of the radial location of shallow damage ($r_d$); and a second permeability value ($k_2$) indicative of permeability of the formation (e.g., in the radial direction) in a second region that is outside of the location of the radial location of shallow damage ($r_d$).

Referring again to FIG. 3 and the characterization of contributing elements to a wellbore pressure of a water injection well system, and analytical solution (also called "mathematical reservoir model") representing the bottom-hole pressure drawdown in the Laplace space ($\overline{\Delta p}_{wf\_q}$), taking into consideration to wellbore storage constant (C) and skin factor (s), can be generated as described below.

First, two transient diffusion equations in pressure for both inner (domain: $r_w \leq r \leq r_d$) and outer (domain: $r_d \leq r \leq \infty$) reservoir regions. Appropriate inner and outer boundary conditions are utilized with the interface conditions at $r=r_d$. For the sake of generality, each reservoir region can have distinct rock and fluid properties, causing distinct hydraulic diffusivity values, $\eta_1$ and $\eta_2$, respectively. Although the well may be injecting water at a given injection rate (−q) (e.g., in units of Standard Barrel (of liquid) per Day (STB/d)) at the standard conditions, the solution may be provided for a unit rate of production per day at the standard conditions. This format of the presented solution is applicable to a wider range of problems (e.g., variable rates of injection prior to a fall-off period—a problem which requires the principle of superposition for those skilled in the art). Notably according to industry conventions on signs of rates, the entered rates (q) should be negative in the following solutions for considering (water) injection in this context.

The following provides a listing of nomenclature used herein:

$A_1, A_2, A_3$ coefficients constituting vector, $\overline{X}$
$B_w$ formation volume factor of injected fluid (water), bbl/STB (stock tank barrel at surface conditions)
$c_{t1}, c_{t2}$ total system compressibility values in inner and outer regions, respectively, 1/psi (1/pounds-per-square-inch)
C wellbore storage constant, bbl/psi (barrel/pounds-per-square-inch)
$C_f$ fracture storage constant, in bbl/psi
$\overline{\overline{C}}$ (3×3) matrix defined in Equation 4
FFP formation fracture pressure, psia
FPG fracture pressure gradient, psia/ft (pounds-per-square-inch absolute/foot)
h payzone thickness, feet (ft)
IPG injection pressure gradient, defined in Equation 1, psia/ft
$I_0$ a modified Bessel function of the first kind of order 0
$k_1, k_2$ permeability values in the radial direction (horizontal) of inner and outer regions, respectively, millidarcy (md)
$K_0$ a modified Bessel function of the second kind of order 0
l a Laplace transform parameter, 1/hr
$p_0$ initial reservoir pressure, psia
p(r,t) pressure anywhere as a function of space (r) and time (t), psia
$\Delta p(r,t)$ pressure drawdown at r at a given time (t), $p_0-p(r,t)$, psia
$p_{test}$ wellbore flowing pressure at downhole conditions for water injection rate of $q_{test}$, psia
$p_{wf}(t)$ wellbore flowing pressure at downhole conditions, psia
$p_{wfFPG}$ Wellbore flowing pressure at downhole conditions at which IPG=FPG, psia
$p_{wh}(t)$ wellbore flowing pressure at wellhead conditions, psia
$\overline{p}_{wf}(l)$ Laplace transform of wellbore flowing pressure $p_{wf}$, psia-hr
$\Delta p_{wf}(t)$ pressure drawdown at downhole conditions at a given time (t), $(p_0-p_{wf}(t))$ for a given rate of production or injection, psia
$\overline{\Delta p}_{wf}(l)$ Laplace transform of pressure drawdown ($\Delta p_{wf}(t)$) in tested well, $p_0/l-\overline{p}_{wf}(l)$, for a given rate of production or injection, psia-hr
$\overline{\Delta p}_{wf\_q}$ Laplace transform of pressure drawdown ($\Delta p_{wf\_q}(t)$) for unit rate of production at standard conditions, accounting for wellbore storage, skin and fracture storage effects, psia-hr
q constant rate of injection (in negative value) at standard conditions, STB/d
$q_{cur}$ current injection (in negative value) at standard conditions in subject well, STB/d
$q_{FPG}$ constant rate of injection (in negative value) at standard conditions which causes IPG=FPG, or fracturing injection rate, STB/d
$q_{min}$ minimum rate of injection (in negative value) at standard conditions in subject well as determined by reservoir management strategy, STB/d
$q_{test}$ test injection rate, STB/d
r radial distance from center of wellbore, feet (ft)
$r_d$ radial location of shallow damage (also location of interface between inner and outer regions) (see, e.g., FIGS. 1A and 1B), feet (ft)
$r_w$ physical wellbore radius, feet (ft)
$r_{we}$ equivalent wellbore radius due to skin (defined in Equation 19), feet (ft)
s skin factor at sandface in well, unitless
$s_d$ shallow damage (additional resistance to flow) located deep inside reservoir and characterized in terms of skin factor, unitless
t elapsed time since beginning of first injection, hours (hr)
$TVD_1, TVD_2$ true vertical depth at the wellhead and mid-reservoir level, respectively, from a datum level, feet (ft)
$\Delta TVD$ true vertical depth from the wellhead to the mid-reservoir level, feet (ft)
$\overline{X}$ (3×1) vector defined in Equation 5
$\overline{Z}$ (3×1) vector defined in Equation 6
$\alpha$ parameter defined in Equation 9

$\beta_1$, $\beta_2$ parameters defined in Equations 10 and 11, respectively $\delta_1$, $\delta_2$ parameters defined in Equations 12 and 13, respectively $\gamma$ parameter defined in Equation 14

$\gamma_e$ parameter defined in Equation 18

$\eta_1$, $\eta_2$ hydraulic diffusivity (presented in Equations 15 and 16) respectively, millidarcy pounds-per-square-inch per centipoise (md-psi/cP)

$\phi_1$, $\phi_2$ porosity values in inner and outer regions, respectively, expressed as a fraction, unitless $\mu$ viscosity of water, centipoise (cP)

and subscripts:

(C=0) s $C_f$ with wellbore skin and fracture storage effects but without wellbore storage effects (C=0) s ($C_f$=0) with wellbore skin effects but without wellbore and fracture storage effects (C=0)(s=0)($C_f$=0) without any of wellbore, wellbore skin or fracture storage effects Applying the initial, boundary and interface conditions in the Laplace space, the following system of linear equations may be derived:

$$\bar{\bar{C}}\bar{X} = \bar{Z} \qquad (3)$$

where $$\bar{\bar{C}} = \begin{bmatrix} \alpha\gamma K_1(\gamma) & -\alpha\gamma I_1(\gamma) & 0 \\ -K_0(\beta_1) + s_d\beta_1 K_1(\beta_1) & -I_0(\beta_1) - s_d\beta_1 I_1(\beta_1) & K_0(\beta_2) \\ -\delta_1 K_1(\beta_1) & \delta_1 I_1(\beta_1) & \delta_2 K_1(\beta_2) \end{bmatrix} \qquad (4)$$

$$\bar{X} = \begin{bmatrix} A_1 \\ A_2 \\ A_3 \end{bmatrix} \qquad (5)$$

$$\bar{Z} = \begin{bmatrix} B_w/l \\ 0 \\ 0 \end{bmatrix} \qquad (6)$$

The (3×1) vector in Equation 5 ($\bar{X}$) can be populated with all three unknown values, which are to be determined from the following equation (deduced from Equation 3):

$$\bar{X} = \bar{\bar{C}}^{-1}\bar{Z} \qquad (7)$$

where $\bar{\bar{C}}^{-1}$ is the inverse of matrix, $\bar{\bar{C}}$, which is invertible. Having calculated the elements of $\bar{X}$ from Equation 7, the downhole pressure drawdown in the Laplace space for a unit rate of production at the standard conditions, $\overline{\Delta p}_{w\,q(C=0)(s=0)(C_f=0)}$, without any of the wellbore storage, the wellbore skin and the fracture storage effects can be calculated from the following equation:

$$\overline{\Delta p}_{wq(C=0)(s=0)(C_f=0)} = A_1 K_0(\gamma) + A_2 I_0(\gamma) \qquad (8)$$

The parameters used in Equations 4 and 8 can be defined as follows:

$$\alpha = \frac{k_1 h}{141.2\mu} \qquad (9)$$

$$\beta_1 = r_d\sqrt{l/\eta_1} \qquad (10)$$

$$\beta_2 = r_d\sqrt{l/\eta_2} \qquad (11)$$

$$\delta_1 = k_1\sqrt{1/\eta_1} \qquad (12)$$

-continued $$\delta_2 = k_2\sqrt{l/\eta_2} \qquad (13)$$

$$\gamma = r_w\sqrt{l/\eta_1} \qquad (14)$$

$$\eta_1 = \frac{0.0002637 k_1}{\phi_1 \mu c_{t1}} \qquad (15)$$

$$\eta_2 = \frac{0.0002637 k_2}{\phi_2 \mu c_{t2}} \qquad (16)$$

The solution for drawdown in the Laplace space for a unit rate of production, presented in Equation 8, does not consider any of the wellbore storage, the wellbore skin and the fracture storage effects. A well skin factor of s can be accounted for by modifying Equation 8 to the following form:

$$\overline{\Delta p}_{w\,q(c=0)s(C_f=0)} = A_1 K_0(\gamma_e) + A_2 I_0(\gamma_e) \qquad (17)$$

where:

$$\gamma_e = r_{we}\sqrt{l/\eta_1} \qquad (18)$$

$$r_{we} = r_w\exp(-s) \qquad (19)$$

Equation 17 considers the wellbore skin effect through an equivalent wellbore radius expressed therein. For s=0 (no skin), Equation 17 reduces into Equation 8. Accounting for the fracture storage constant of ($C_f$), Equation 17 may be represented as follows:

$$\overline{\Delta p}_{wq(C=0)sC_f} = \frac{A_1 K_0(\gamma_e) + A_2 I_0(\gamma_e)}{1 + 24 C_f l^2 [A_1 K_0(\gamma_e) + A_2 I_0(\gamma_e)]} \qquad (20)$$

The downhole pressure drawdown in the Laplace space ($\overline{\Delta p}_{wf\,q}$) having included the wellbore storage constant (C), can be expressed as follows:

$$\overline{\Delta p}_{wf\,q} = \frac{\overline{\Delta p}_{wq(C=0)sC_f}}{1 + 24Cl^2 \overline{\Delta p}_{wq(C=0)s C_f}} \qquad (21)$$

where $\overline{\Delta p}_{wq(C=0)s\,C_f}$ is extracted from Equation 20.

Equation 21 is a general form of the solution for a downhole pressure drawdown in the Laplace space due to a unit rate of production at standard conditions, incorporating the wellbore storage (C), the wellbore skin ($s_d$) and the fracture storage effects ($C_f$). Notably, Equation 21 reduces into Equation 17 for C=0 and $C_f$=0. The final form of the analytical solution presented in Equation 21 can be summarized by the diagram presented in FIG. 3, which highlights the major elements (from the outer reservoir region to the downhole pressure gage) that influence the measured downhole wellbore pressure ($p_{wf}$). The values of $\overline{\Delta p}_{wf\,q}$ from Equation 21 can be inverted back to the respective values of the pressure drawdown for a unit rate of production at standard conditions ($\overline{\Delta p}_{wf\,q}$) in the time domain (e.g., using the algorithm presented by H. Stehfest, "Algorithm 368—Numerical Inversion of Laplace Transforms [D5]", Communications of the ACM (1970), Vol. 13, Number 1, pp. 47-49). Equation 21 may be suitable for use with a superposition algorithm for dealing with situations of variable rates of injection, including the fall-off periods.

In some embodiments, while calculating the downhole pressure drawdown ($\Delta p_{wf}$) at the tested well with Equation 21, the corresponding pressure derivative, $$\left(\left|t\frac{dp_{wf}}{dt}\right| = \left|t\frac{d\Delta p_{wf}}{dt}\right|\right),$$

can also be calculated, simultaneously, both as functions of time after applying the Stehfest algorithm (1970), cited earlier, to their respective Laplace-space versions (e.g., by utilizing the process outlined by N. M. A. Rahman and S. A. Bin Akresh, "Profiling Pressure-Derivative Values—A New, Innovative Way to Estimate the Radii of Investigation in Heterogeneous Reservoir Systems, Paper SPE 164217 presented at SPE Middle East Oil and Gas Show and Exhibition, Manama, Bahrain, 10-13 Mar., 2013). Another application of Equation 21 can be shown by calculating the downhole pressure increment in the Laplace space ($\overline{\Delta p}_{wf}$) at the wellbore for a constant rate of injection (q) as follows:

$$\overline{\Delta p}_{wf} = -q\overline{\Delta p}_{wfq} = -\frac{q\overline{\Delta p}_{wq(C=0)s c_f}}{1 + 24Cl^2 \overline{\Delta p}_{wq(C=0)s c_f}} \quad (22)$$

The negative sign on the right-hand side of Equation 22 may account for injection as per industry conventions. Notably, the calculated values with the equations as presented above, following the inverse Laplace transforms, will result in pressure drawdown ($\overline{\Delta p}_{wf}$) and pressure derivative $$\left(\left|t\frac{dp_{wf}}{dt}\right|\right)$$

in psia as functions of elapsed time. Any variations from the system of US Oilfield units or conversions to another system of units can readily be accommodated.

Using the above solution presented in equation 21, estimated values for C, s, $C_f$, $S_d$, $r_d$, $k_1$ and $k_2$ can be substituted in the equation to generate a model prediction of pressure drawdown for a well for a unit rate of production at standard conditions. The model prediction of pressure drawdown can be compared to the observed/measured pressure drawdown during the fall-off test of a well (e.g., derived from the well test data) to determine whether the model prediction of pressure drawdown (using the estimated values for C, s, $C_f$, $s_d$, $r_d$, $k_1$ and $k_2$) matches the observed pressure drawdown during the fall-off test of the well. If it does, then the well may be associated with the estimated values for C, s, $C_f$, $s_d$, $r_d$, $k_1$ and $k_2$. If it does not, the one or more of the estimated values for C, s, $C_f$, $s_d$, $r_d$, $k_1$ and $k_2$ can be modified to generate a modified model prediction of pressure drawdown, and the modified model prediction can be compared to the observed pressure drawdown during the fall-off test of the well to determine whether the model prediction of pressure drawdown (using the estimated values for C, s, $C_f$, $s_d$, $r_d$, $k_1$ and $k_2$) matches the observed pressure drawdown during the fall-off test of the well. Such an iterative process can be repeated until a matched model is identified, and the well may be associated with the estimated values for C, s, $C_f$, $s_d$, $r_d$, $k_1$ and $k_2$ of the matched model. As further described, the severity and the location of any shallow damage of the well can be determined based on the resulting values of the shallow damage parameter ($s_d$) and the radial location of shallow damage parameter ($r_d$).

FIG. 5 is a flowchart diagram that illustrates an example method 500 for determining reservoir parameters, including the shallow damage parameter ($s_d$) and the radial location of shallow damage parameter ($r_d$), for a water injection well in accordance with one or more embodiments. Method 500 may be performed subsequent to the transient-pressure test operation described with regard to method 400, and using the well test data 422 generated via the transient-pressure test operation. Method 500 may be performed, for example, by the control unit 200.

Method 500 may include selecting a range of well test data (block 502). In some embodiments, selecting a range of well test data includes identifying a time-frame of interest, such as some or all of the duration of the fall-off test, and selecting a subset of the well test data over the time frame of interest. For example, with regard to the above described the transient-pressure test operation that includes a prescribed period of injection (e.g., about 200 hrs extending from about the start $800^{th}$ hour to about the start of the $1,000^{th}$ hour), followed by a fall-off test having a duration of about 100 hrs, selecting a range of well test data may include identifying the 100 hrs of the fall-off test, and selecting the portion of the well test data 422 that falls within the 100 hrs of the fall-off test (e.g., from the start of $1,000^{th}$ hr to the end of $1,100^{th}$ hr).

Method 500 may include determining well pressure and pressure derivatives for the downhole conditions (block 504). In some embodiments, determining well pressure and pressure derivatives for the well test data captured at (or converted to) the downhole conditions includes generating log-log, semi-log and history plots for the selected a range of well test data, and determining well pressure and pressure derivatives for the downhole conditions from the plots. Continuing with the above example this may include generating log-log, semi-log and history plots for the selected a range of well test data 422 within the 100 hrs of the fall-off test (e.g., from the start of $1,000^{th}$ hr to the end of $1,100^{th}$ hr), and determining well pressure and pressure derivatives for the downhole conditions from the plots. Example log-log, semi-log and history plots for a selected a range of well test data 422 are illustrated by the thick lines and dots in the charts of FIGS. 6A-6D (described below) that illustrate example alignment of measured well test data and a matched model prediction in accordance with one or more embodiments.

Method 500 may include determining certain reservoir characteristics (block 506). In some embodiments, determining certain reservoir characteristics includes obtaining one or more know or predetermined reservoir characteristics for the reservoir in which the well is located, from a database. For example, determining certain reservoir characteristics may include obtaining rock, fluid and petrophysical properties of the reservoir 106 (e.g., FPG, $B_w$, $c_{t1}$, $c_{t2}$, h, $\phi_1$, $\phi_2$, $\mu$) from a database stored in memory of the control unit 200.

Method 500 may include determining initial reservoir parameter values (block 508). In some embodiments, determining initial reservoir parameter values includes identifying values for each of the following: a wellbore storage constant (C); a well skin factor (s); a fracture storage constant ($C_f$); a radial location of shallow damage ($r_d$) (e.g., indicative of the location of shallow damage); a shallow damage skin factor ($s_d$) (e.g., indicative of the severity of the shallow damage 120); a first permeability value ($k_1$) (e.g., indicative of permeability of the formation (e.g., in the radial direction) in a first/inner region 130; and a second permeability value ($k_2$) (e.g., indicative of permeability of the formation (e.g., in the radial direction) in a second/outer region 140). In some embodiments, these values may be provided via an interactive graphical user interface (GUI) presented to a user (e.g., a well operator, or other analyst). For example, a user may enter values for each of the above reservoir parameter values (C, s, $C_f$, $s_d$, $r_d$, $k_1$ and $k_2$) into interactive fields displayed to the user. In this initial iteration, the user may select the values based on knowledge of the reservoir 106 and best guess estimation of the values. In later iterations (e.g., block 516), the user may select the values based on knowledge of the reservoir 106 and best guess estimation of the values based on the variance of one or more previously generated models to the observed data as described below. In some embodiments, these values may be populated automatically by the control system 200. For example, the processor of the control unit 200 may select an initial set of values that it can iteratively adjust, if needed, to determine a matching model or the best matching model and corresponding reservoir parameter values (C, s, $C_f$ $s_d$, $r_d$, $k_1$ and $k_2$).

Method 500 may include generating model downhole (or bottomhole) pressure ($p_{wf}$) values using the currently selected reservoir parameter values (block 510). The mathematical reservoir model utilized in some embodiments, especially in block 510, for predicting the bottomhole pressure during the periods of injection and fall-off is described herein. In some embodiments, generating model downhole or bottomhole pressure values using the currently selected reservoir parameter values includes generating the model bottomhole pressure by applying the selected reservoir parameter values to equation 21, the Stehfest algorithm and the principle of supposition (as described herein) to determine a model prediction of the bottomhole pressure drawdown in the Laplace space for the selected reservoir parameter values, and calculating the pressure derivative of the model bottomhole pressure ($p_{wf}$) (as described herein). Example log-log, semi-log and history plots for model bottomhole pressure ($p_{wf}$) values (corresponding to the selected a range of well test data 422) are illustrated by the thin solid lines in the charts of FIGS. 6A-6D (described below) that illustrate example alignment of measured well test data and a matched model prediction in accordance with one or more embodiments.

Method 500 may include comparing the model bottomhole pressure values to observed bottomhole pressure values (block 512), and determining whether the model is a match for the well (e.g., whether the model bottomhole pressure values predicted by using the currently selected reservoir parameter values (C, s, $C_f$ $s_d$, $r_d$, $k_1$ and $k_2$) "match" the observed bottomhole pressure values) (block 514). In some embodiments, comparing the model bottomhole pressure values to observed bottomhole pressure values and determining whether the model "matches" the observed bottomhole pressure values may be based on pre-specified criteria, such as threshold standard deviation for the model prediction versus the observed data. For example, the model (e.g., using the currently selected reservoir parameter values (C, s, $C_f$ $s_d$, $r_d$, $k_1$ and $k_2$)) may be determined to "match" the observed bottomhole pressure values if the standard deviation of the model bottomhole pressure values ($p_{wf}$) from the observed bottomhole pressure values ($p_{wf}$) is less than or equal to a standard deviation of 0.1 psia, for example. Conversely, the model (e.g., using the currently selected reservoir parameter values (C, s, $C_f$ $s_d$, $r_d$, $k_1$ and $k_2$)) may be determined to not "match" the observed bottomhole pressure values if the standard deviation of the model bottomhole pressure values ($p_{wf}$) from the observed bottomhole pressure values ($p_{wf}$) is above the standard deviation of 0.1 psia, for example. Although a standard deviation of about 0.1 psia is used for the purpose of illustration, embodiments may employ any suitable standard deviation or other criteria. In some embodiments, the comparison may include generating and presenting log-log, semi-log and history plots for model and observed bottomhole pressure ($p_{wf}$) values (corresponding to the selected a range of well test data 422). Such plots may include a depiction of the model values (e.g., one or more curves for the model values) overlaid on a depiction of the observed values (e.g., data points or one or more curves for the observed values). The plots may be displayed to a user (e.g., via an interactive graphical user interface (GUI) of the control unit 200), thereby allowing the user to visually compare the model bottomhole pressure values to observed bottomhole pressure values and, thereby, assess whether the model is a "match" for the well. In some embodiments, the user may able to select (e.g., via an interactive elements, such as a button on the screen) whether the model is a "match" for the well.

Figure 6A:
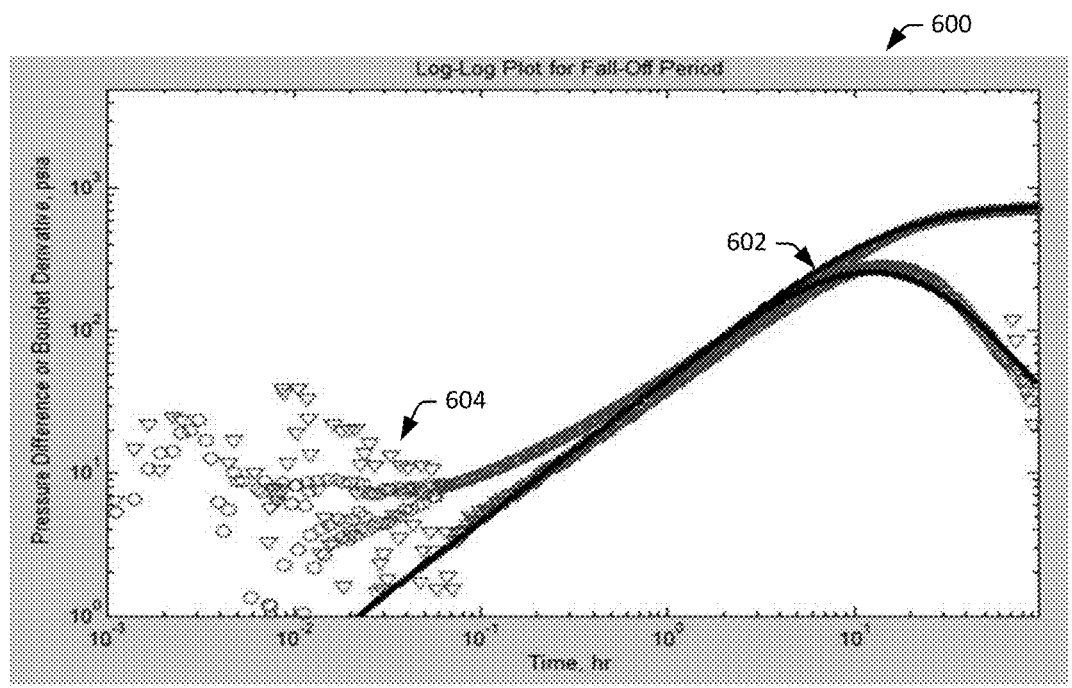
FIGS. 6A-6D are example plots that illustrate example alignment of measured well test data and a matched model prediction in accordance with one or more embodiments.
Figure 6B:
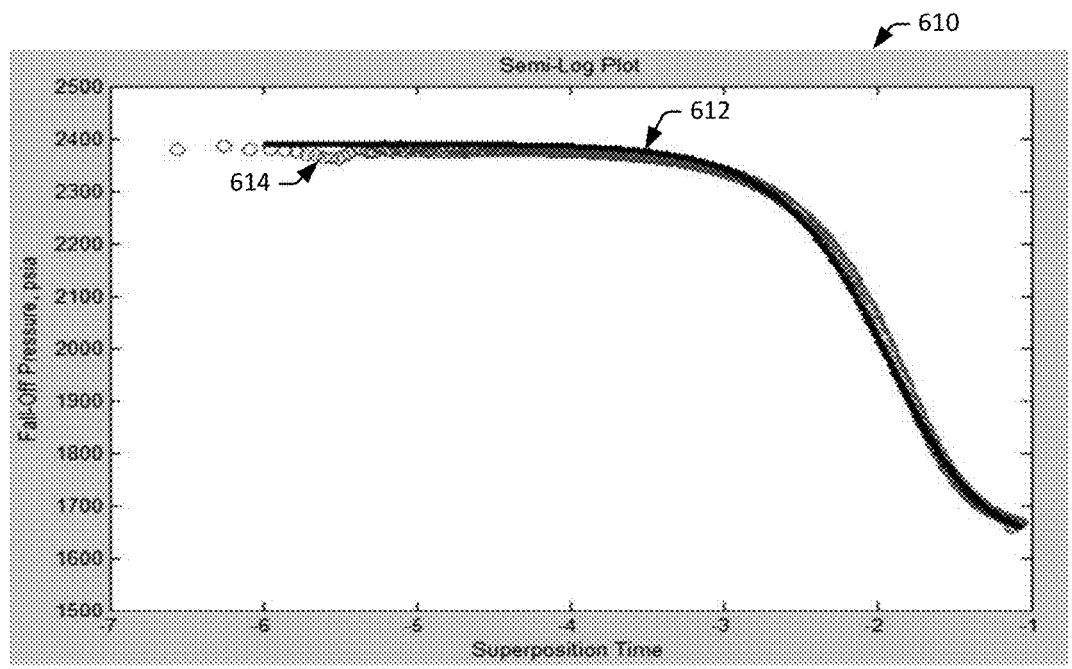
Figure 6C:
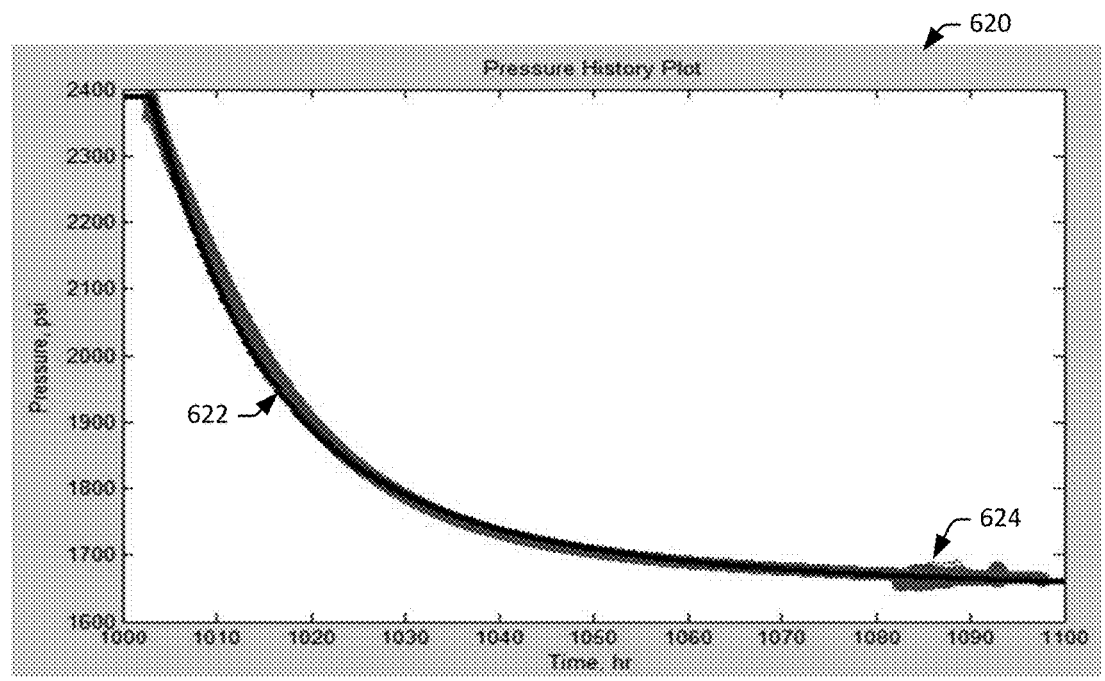
Figure 6D:
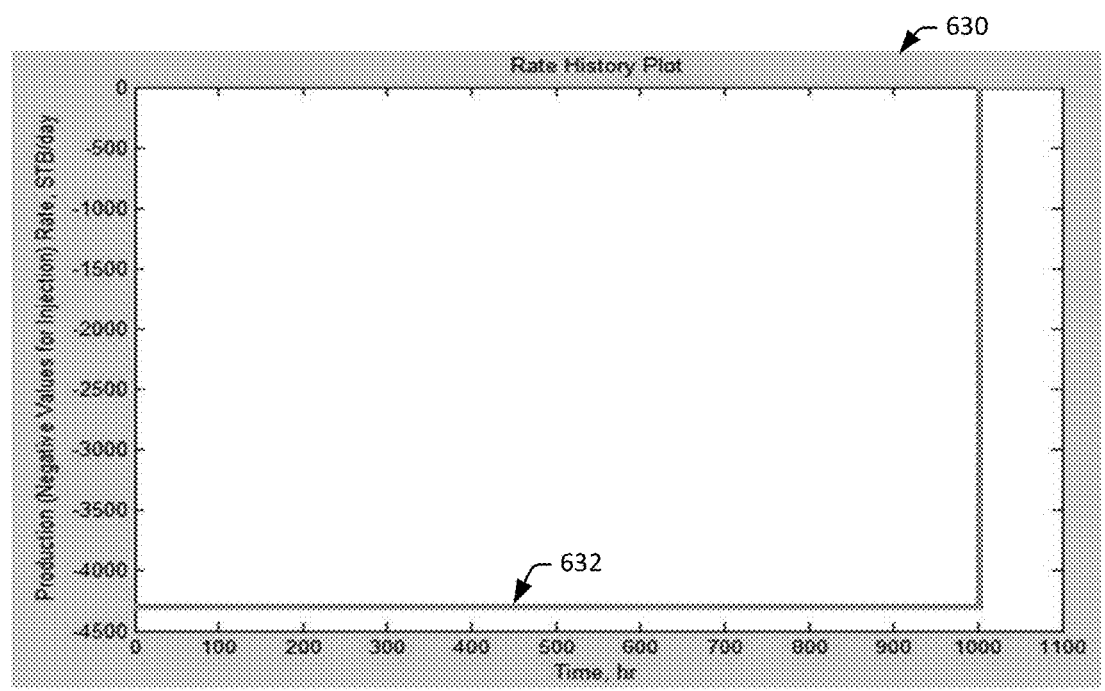

FIGS. 6A-6D are example plots that illustrate example alignment of measured well test data and a matched model prediction in accordance with one or more embodiments. FIG. 6A illustrates an example log-log plot 600 for a fall-off period, charting pressure difference and Bourdet Derivative (psia) versus time (hr), and including model curves 602 (solid lines) representing the model values for pressure difference and Bourdet Derivative generated using selected reservoir parameter values (C, s, $C_f$ $s_d$, $r_d$, $k_1$ and $k_2$) that are overlaid onto observed data points 604 representing the observed values for pressure difference and Bourdet Derivative derived from measurements during the fall-off test of the well. FIG. 6B illustrates an example semi-log plot 610 for the fall-off period, charting fall-off pressure (psia) versus supposition time, and including a model curve 612 (solid line) representing the model values for fall-off pressure (psia) generated using the selected reservoir parameter values (C, s, $C_f$ $s_d$, $r_d$, $k_1$ and $k_2$) that are overlaid onto observed data points 614 representing the observed values for fall-off pressure (psia) derived from measurements during the fall-off test of the well. FIG. 6C illustrates an example pressure history plot 620 for the fall-off period, charting pressure (psi) versus time (hr), and including a model curve 622 (solid line) representing the model values for pressure (psia) generated using the selected reservoir parameter values (C, s, $C_f$ $s_d$, $r_d$, $k_1$ and $k_2$) that are overlaid onto observed data points 624 representing the observed values derived from measurements during the fall-off test of the well. FIG. 6D illustrates an example injection rate history plot 630 for the duration of the transient-pressure test, including the about 1,003 hrs of injection into the well at a stabilized injection rate (e.g., in accordance with that described with regard to block 418 of method 400), and the subsequent about 97 hrs of the fall-off test of the well immediately following the stabilized injection into the well. As depicted, an injection rate curve 632 indicates a production rate (a negative value of which means an injection rate) (STB/day) of about −4,300 STB/day during the about 1,003 hrs of injection into the well, followed by a production rate (or injection rate) of about 0 STB/day during the about 97 hrs of the fall-off test of well (consistent with the well while being shut-in during the fall-off test). Such plots (e.g., 600, 610, 620 and 630) may be presented to a user, for example, for use in comparing the model bottomhole pressure values to observed bottomhole pressure values and to, thereby, assess whether the model (e.g., using currently selected values for C, s, $C_f$ $s_d$, $r_d$, $k_1$ and $k_2$) is a "match" for the well as discussed above.

If it is determined that the model is not a match for the well (at block 514), then the method 500 may proceed to adjusting one or more of the reservoir parameter values (block 516). Adjusting one or more of the reservoir parameter values may include changing a value for at least one of the currently selected reservoir parameter values (e.g., C, s, $C_f$, $s_d$, $r_d$, $k_1$ and $k_2$)) to a different value, thereby creating a new combination of selected reservoir parameter values. In some embodiments, a value may be changed automatically by the control system 200 to a value that is expected to further align the model values to the observed values. Another iteration of generating model bottomhole pressure ($p_{wf}$) values using the updated currently selected reservoir parameter values (block 510), comparing the updated model bottomhole pressure values to observed bottomhole pressure values (block 512), and determining whether the model is a match for the well (e.g., whether the model bottomhole pressure values derived using the currently selected reservoir parameter values for C, s, $C_f$, $s_d$, $r_d$, $k_1$ and $k_2$) "match" the observed bottomhole pressure values) (block 514) may be performed. Such an iterative process may be continued until a matched model is identified.

If it is determined that the model is a match for the well (at block 518), then the method 500 may proceed to associating the currently selected reservoir parameter values with the well (block 518). For example, the control unit 200 may store, in a memory and/or present for display to a user, the currently selected reservoir parameter values (e.g., the currently selected reservoir parameter values for C, s, $C_f$, $s_d$, $r_d$, $k_1$ and $k_2$) in association with the well 102.

The method 500 may include identifying the location and the severity of a shallow damage for the well (block 520). In some embodiments, identifying the location and the severity of a shallow damage for the well may include identifying at least in part on the shallow damage skin factor ($s_d$) associated with the well and the radial location of shallow damage ($r_d$) associated with the well. For example, if the well 102 is associated with a shallow damage skin factor ($s_d$) of about 20.4 and a radial location of the shallow damage ($r_d$) of about 3.3 ft, then it may be determined that the shallow damage has the severity of about 20.4 at a radius of about 3.3 ft (about 1 meter) from the centerline of the wellbore 104. Thus, method 500 may advantageously provide for the output of the severity and the location of the shallow damage determined.

The method 500 may include selecting a remediation operation for the well (block 522) and conducting the selected remediation operation on the well (block 524). In some embodiment, selecting a remediation operation may include selecting a remediation operation based at least in part on the severity and/or location of the shallow damage. For example, continuing with the above example, if it is determined that the shallow damage has a severity of about 20.4 at a radius of about 3.3 ft (about 1 meter) from the centerline of the wellbore 104, then selecting a remediation operation may include selecting a stimulation injection operation for the well 102 that is designed to remediate shallow damage having a severity of about 20.4 and/or at a radius of about 3.3 ft (about 1 meter) from the centerline of the wellbore 104. In some embodiments, the control unit 200 may automatically select a remediation recommendation or operation from a matrix that specifies one or more specific types of remediation operations for various combinations of shallow damage severity and location. Such a selected remediation operation may be automatically conducted, or at least recommended to a user, such as a well operator. Thus, a remediation operation can be selected and conducted to target the specific type of shallow damage identified using the transient-pressure test operation and analysis described herein.

In some embodiments, the control unit 200 can include a computer system (e.g., computer system 1000, described below) for performing some or all of the operations described herein, including those described with regard to the control unit 200 and/or the methods 400 and/or 500. For example, the control unit 200 may include a computer for automatically selecting a test injection rate ($q_{test}$), and operating the well 102 to conduct a transient-pressure test operation and analysis to identify the severity and the location of shallow damage, and to select and conduct an appropriate remediation operation to target the specific type of shallow damage identified.

Figure 7:
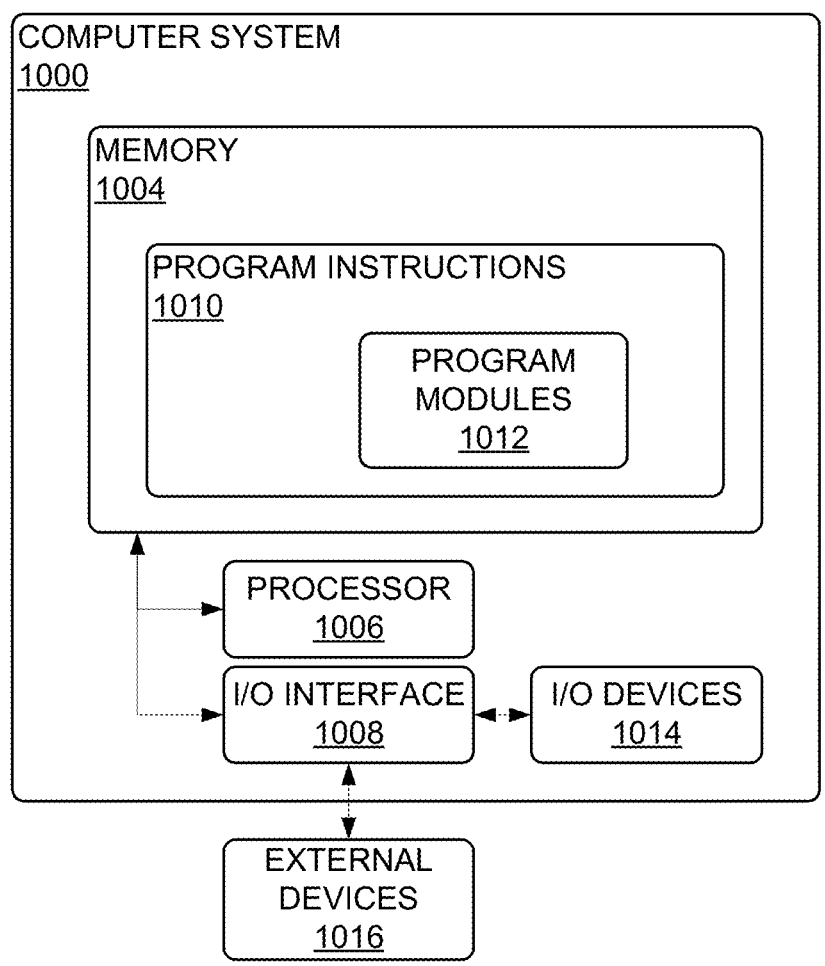
FIG. 7 is a diagram that illustrates an example computer system in accordance with one or more embodiments.

FIG. 7 is a diagram that illustrates an example computer system 1000 in accordance with one or more embodiments. In some embodiments, the computer system 1000 may include a memory 1004, a processor 1006, and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), bulk storage memory (e.g., CD-ROM and/or DVD-ROM, hard drives), and/or the like. The memory 1004 may include a non-transitory computer-readable storage medium having program instructions 1010 stored therein. The program instructions 1010 may include program modules 1012 that are executable by a computer processor (e.g., the processor 1006) to cause the functional operations described herein, including those described with regard to the control unit 200, and/or the methods 400 and/or 500. In the context of a computer system of a control unit 200, the program modules 1012 may include one or more modules for performing some or all of the operations described with regard to the control unit 200, and/or the methods 400 and/or 500.

The processor 1006 may be any suitable processor capable of executing/performing program instructions. The processor 1006 may include a central processing unit (CPU) that carries out program instructions (e.g., the program instructions of the program module(s) 1012) to perform the arithmetical, logical, and input/output operations described herein. The processor 2006 may include one or more processors. The I/O interface 1008 may provide an interface for communication with one or more I/O devices 1014, such as a joystick, a computer mouse, a keyboard, a display screen (e.g., an electronic display for displaying a graphical user interface (GUI)), and/or the like. The I/O devices 1014 may include one or more of the user input devices. The I/O devices 1014 may be connected to the I/O interface 1008 via a wired or a wireless connection. The I/O interface 1008 may provide an interface for communication with one or more external devices 1016, such as other computers, networks, and/or the like. In some embodiments, the I/O interface 1008 may include an antenna, a transceiver, and/or the like. In some embodiments, the computer system 1000 and/or the external devices 1016 may include one or more pressure gauges (e.g., gauge 160), one or more flowmeters (e.g., flowmeter 206), one or more pumps (e.g., pump 202), one or more flow controls (e.g., valve or choke control, 204), and/or the like.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

It will be appreciated that the processes and methods described herein are example embodiments of processes and methods that may be employed in accordance with the techniques described herein. The processes and methods may be modified to facilitate variations of their implementation and use. The order of the processes and methods and the operations provided therein may be changed, and various elements may be added, reordered, combined, omitted, modified, etc. Portions of the processes and methods may be implemented in software, hardware, or a combination thereof. Some or all of the portions of the processes and methods may be implemented by one or more of the processors/modules/applications described herein.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the phrase "based on" does not limit the associated operation to being solely based on a particular item. Thus, for example, processing "based on" data A may include processing based at least in part on data A and based at least in part on data B unless the content clearly indicates otherwise. As used throughout this application, the term "from" does not limit the associated operation to being directly from. Thus, for example, receiving an item "from" an entity may include receiving an item directly from the entity or indirectly from the entity (e.g., via an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. An oil reservoir water injection well system, comprising:

a pump system configured to inject water into a wellbore of a well extending into an oil reservoir of a subsurface formation;

a flow control system configured to regulate flow of water in the wellbore;

a flowmeter system configured to measure fluid flow in the wellbore;

a pressure gauge system configured to measure fluid pressure in the wellbore; and a surface control unit configured to:
  determine whether a minimum injection rate is specified for the water injection well system;
  in response to determining that a minimum injection rate is specified for the well, set a test injection rate for the well to the minimum injection rate; and
  in response to determining that a minimum injection rate is not specified for the well:
    determine an injection pressure gradient corresponding to a current injection rate for the well;
    determine a fracture pressure gradient for the well;
    determine whether the injection pressure gradient is greater than the fracture pressure gradient;
    in response to determining that the injection pressure gradient is not greater than the fracture pressure gradient, set the test injection rate for the well to the current injection rate corresponding to the injection pressure gradient; and
    in response to determining that the injection pressure gradient is greater than the fracture pressure gradient:
      determine a fracturing injection rate for the well; and
      set the test injection rate for the well to an injection rate below the fracturing injection rate to reduce the fracture storage constant;
  conduct an injection test comprising:
    controlling the pump system and the flow control system to regulate a stabilized water injection at the test injection rate for a prescribed injection period; and
    acquiring injection test data comprising:
      well injection measurements, from the flowmeter system, that are indicative of fluid flow rate in the wellbore of the well during the prescribed injection period; and
      well pressure measurements, from the pressure gauge system, that are indicative of fluid pressure in the wellbore of the well during the prescribed injection period;
  conduct a fall-off test comprising:
    controlling the pump system and the flow control system to shut-in the well for a prescribed fall-off period; and
    acquiring, during the fall-off period, well test data comprising:
      well pressure measurements, from the pressure gauge system, that are indicative of fluid pressure in the wellbore of the well during the fall-off period; and
      well injection measurements, from the flowmeter system, that are indicative of fluid flow in the wellbore of the well during the fall-off period that can be used to confirm no fluid flow in the wellbore of the well during the fall-off period;
  determine a reservoir model comprising a set of well and reservoir parameter values, the reservoir parameter values comprising:

a shallow damage skin factor ($s_d$) identifying a severity of shallow damage occurring in the reservoir a distance from walls of the wellbore;

a radial location of shallow damage ($r_d$) defined by the distance from the walls of the wellbore;

a first permeability value ($k_1$) indicative of permeability of the reservoir in a first region that is inside the radial location of shallow damage ($r_d$), the first region defined by a portion of the reservoir that is located less than the distance from the walls of the wellbore; and a second permeability value ($k_2$) indicative of permeability of the reservoir in a second region that is outside of the radial location of shallow damage ($r_d$), the second region defined by a portion of the reservoir that is located greater than the distance from the walls of the wellbore;

generate a model prediction using the reservoir model;

compare the model prediction to the well test data to determine whether the reservoir model is a match for the well; and in response to determining that the reservoir model is a match for the well, associating the set of well and reservoir parameter values with the well.

2. The system of claim 1, wherein the surface control unit is configured to:

select a shallow damage remediation operation based at least in part on the shallow damage skin factor ($s_d$) and the radial location of shallow damage ($r_d$) associated with the well; and provide for conducting the shallow damage remediation operation to remediate the shallow damage in the reservoir.

3. The system of claim 1, wherein the reservoir model incorporates a wellbore storage constant indicative of fluid storage capacity of the wellbore, a wellbore skin factor indicative of resistance of fluid flow across a wellbore skin of the wellbore, and a fracture storage constant indicative of a fluid capacity of a fracture zone in the reservoir.

4. The system of claim 1, wherein the set of well and reservoir parameter values comprise:

a wellbore storage constant (C) indicative of fluid storage capacity of the wellbore;

a well skin factor (s) indicative of resistance of fluid flow across a wellbore skin of the wellbore; and a fracture storage constant ($C_f$) indicative of a fluid capacity of a fracture zone in the reservoir.

5. An oil reservoir water injection well system, comprising:

a pump system configured to inject water into a wellbore of a well extending into an oil reservoir of a subsurface formation;

a flow control system configured to regulate flow of water in the wellbore;

a flowmeter system configured to measure fluid flow in the wellbore;

a pressure gauge system configured to measure fluid pressure in the wellbore; and a control unit configured to;

determine a fracturing injection rate for the well;

set a test injection rate for the well to an injection rate below the fracturing injection rate;

conduct an injection test comprising:

controlling the pump system and flow control system to inject water into the wellbore of the well at the test injection rate for a prescribed injection period; and acquiring injection test data indicative of fluid flow rate in the wellbore of the well and fluid pressure in the wellbore of the well during the injection period;

conduct a fall-off test comprising:

controlling the pump system and the flow control system to shut-in the well for a prescribed fall-off period; and acquiring well test data indicative of fluid pressure in the wellbore of the well during the fall-off period;

determine a reservoir model comprising a set of well and reservoir parameter values, the reservoir parameter values comprising:

a shallow damage skin factor ($s_d$) identifying a severity of shallow damage occurring in the reservoir a distance from walls of the wellbore;

a radial location of shallow damage ($r_d$) defined by the distance from the walls of the wellbore;

a first permeability value ($k_1$) indicative of permeability of the reservoir in a first region that is inside the radial location of shallow damage ($r_d$), the first region defined by a portion of the reservoir that is located less than the distance from the walls of the wellbore; and a second permeability value ($k_2$) indicative of permeability of the reservoir in a second region that is outside of the radial location of shallow damage ($r_d$), the second region defined by a portion of the reservoir that is located greater than the distance from the walls of the wellbore;

generate a model prediction using the reservoir model;

compare the model prediction to the well test data to determine whether the reservoir model is a match for the well; and in response to determining that the reservoir model is a match for the well, associating the set of well and reservoir parameter values with the well.

6. The system of claim 5, wherein the control unit is configured to:

determine whether a minimum injection rate is specified for the water injection well system;

in response to determining that a minimum injection rate is specified for the well, set the test injection rate for the well to the minimum injection rate; and in response to determining that a minimum injection rate is not specified for the well:

determine an injection pressure gradient corresponding to a current injection rate for the well;

determine a fracture pressure gradient for the well;

determine whether the injection pressure gradient is greater than the fracture pressure gradient;

in response to determining that the injection pressure gradient is not greater than the fracture pressure gradient, set the test injection rate for the well to the current injection rate corresponding to the injection pressure gradient; and in response to determining that the injection pressure gradient is greater than the fracture pressure gradient:

determine a fracturing injection rate for the well; and set the test injection rate for the well to an injection rate below the fracturing injection rate.

7. The system of claim 5, wherein the well test data comprises:

well pressure measurements, acquired via the pressure gauge system, that are indicative of fluid pressure in the wellbore of the well during the fall-off period; and well injection measurements, acquired via the flowmeter system, that are indicative of fluid flow in the wellbore of the well during the fall-off period.

8. The system of claim 5, wherein the control unit is configured to:
select a shallow damage remediation operation based at least in part on the shallow damage skin factor ($s_d$) and the radial location of shallow damage (r) associated with the well; and
provide for conducting the shallow damage remediation operation to remediate the shallow damage in the reservoir.

9. The system of claim 5, wherein the reservoir model incorporates a wellbore storage constant indicative of fluid storage capacity of the wellbore, a wellbore skin factor indicative of resistance of fluid flow across a wellbore skin of the wellbore, and a fracture storage constant indicative of a fluid capacity of a fracture zone in the reservoir.

10. The system of claim 5, wherein the set of well and reservoir parameter values comprise:
a wellbore storage constant (C) indicative of fluid storage capacity of the wellbore;
a well skin factor (s) indicative of resistance of fluid flow across a wellbore skin of the wellbore; and
a fracture storage constant ($C_f$) indicative of a fluid capacity of a fracture zone in the reservoir.

11. A method for transient-pressure test of an oil reservoir water injection well system, the method comprising:
determining a fracturing injection rate for a well having a wellbore extending into an oil reservoir of a subsurface formation;
setting a test injection rate for the well to an injection rate below the fracturing injection rate;
conducting an injection test comprising:
injecting water into the wellbore of the well at the test injection rate for a prescribed injection period;
acquiring injection test data indicative of fluid flow rate in the wellbore of the well and fluid pressure in the wellbore of the well during the prescribed injection period;
conducting a fall-off test comprising:
shutting-in the well for a prescribed fall-off period; and
acquiring well test data indicative of fluid pressure in the wellbore of the well during the fall-off period;
determining a reservoir model comprising a set of well and reservoir parameter values, the reservoir parameter values comprising:
a shallow damage skin factor ($s_d$) identifying a severity of shallow damage occurring in the reservoir a distance from walls of the wellbore;
a radial location of shallow damage ($r_d$) defined by the distance from the walls of the wellbore;
a first permeability value ($k_1$) indicative of permeability of the reservoir in a first region that is inside the radial location of shallow damage ($r_d$), the first region defined by a portion of the reservoir that is located less than the distance from the walls of the wellbore; and
a second permeability value ($k_2$) indicative of permeability of the reservoir in a second region that is outside of the radial location of shallow damage ($r_d$), the second region defined by a portion of the reservoir that is located greater than the distance from the walls of the wellbore;
generating a model prediction using the reservoir model;
comparing the model prediction to the well test data to determine whether the reservoir model is a match for the well; and
in response to determining that the reservoir model is a match for the well, associating the set of well and reservoir parameter values with the well.

12. The method of claim 11, further comprising:
determining whether a minimum injection rate is specified for the water injection well system;
in response to determining that a minimum injection rate is specified for the well, setting the test injection rate for the well to the minimum injection rate; and
in response to determining that a minimum injection rate is not specified for the well:
determining an injection pressure gradient corresponding to a current injection rate for the well;
determining an fracture pressure gradient for the well;
determining whether the injection pressure gradient is greater than the fracture pressure gradient;
in response to determining that the injection pressure gradient is not greater than the fracture pressure gradient, set the test injection rate for the well to the current injection rate corresponding to the injection pressure gradient; and
in response to determining that the injection pressure gradient is greater than the fracture pressure gradient:
determining a fracturing injection rate for the well; and
setting the test injection rate for the well to an injection rate below the fracturing injection rate.

13. The method of claim 11, wherein the well test data comprises:
well pressure measurements that are indicative of fluid pressure in the wellbore of the well during the fall-off period; and
well injection measurements that are indicative of fluid flow in the wellbore of the well during the fall-off period.

14. The method of claim 11, further comprising:
selecting a shallow damage remediation operation based at least in part on the shallow damage skin factor ($s_d$) and the radial location of shallow damage ($r_d$) associated with the well; and
conducting the shallow damage remediation operation to remediate the shallow damage in the reservoir.

15. The method of claim 11, wherein the reservoir model incorporates a wellbore storage constant indicative of fluid storage capacity of the wellbore, a wellbore skin factor indicative of resistance of fluid flow across a wellbore skin of the wellbore, and a fracture storage constant indicative of a fluid capacity of a fracture zone in the reservoir.

16. The method of claim 11, wherein the set of well and reservoir parameter values comprise:
a wellbore storage constant (C) indicative of fluid storage capacity of the wellbore;
a well skin factor (s) indicative of resistance of fluid flow across a wellbore skin of the wellbore; and
a fracture storage constant ($C_f$) indicative of a fluid capacity of a fracture zone in the reservoir.

17. A non-transitory computer readable storage medium comprising program instructions for transient-pressure test of an oil reservoir water injection well system, the program instructions executable by a computer processor to cause:
determining a fracturing injection rate for a well having a wellbore extending into an oil reservoir of a subsurface formation;

setting a test injection rate for the well to an injection rate below the fracturing injection rate;
conducting an injection test comprising:
  injecting water into the wellbore of the well at the test injection rate for a prescribed injection period; and
  acquiring injection test data indicative of fluid flow rate in the wellbore of the well and fluid pressure in the wellbore of the well during the prescribed injection period;
conducting a fall-off test comprising:
  shutting-in the well for a prescribed fall-off period; and
  acquiring well test data indicative of fluid pressure in the wellbore of the well during the fall-off period;
determining a reservoir model comprising a set of well and reservoir parameter values, the reservoir parameter values comprising:
  a shallow damage skin factor ($s_d$) identifying a severity of shallow damage occurring in the reservoir a distance from walls of the wellbore;
  a radial location of shallow damage ($r_d$) defined by the distance from the walls of the wellbore;
  a first permeability value ($k_1$) indicative of permeability of the reservoir in a first region that is inside the radial location of shallow damage ($r_d$), the first region defined by a portion of the reservoir that is located less than the distance from the walls of the wellbore; and
  a second permeability value ($k_2$) indicative of permeability of the reservoir in a second region that is outside of the radial location of shallow damage ($r_d$), the second region defined by a portion of the reservoir that is located greater than the distance from the walls of the wellbore;
generating a model prediction using the reservoir model;
comparing the model prediction to the well test data to determine whether the reservoir model is a match for the well; and
in response to determining that the reservoir model is a match for the well, associating the set of well and reservoir parameter values with the well.

* * * * *